US012322043B2

(12) United States Patent
Misztal et al.

(10) Patent No.: US 12,322,043 B2
(45) Date of Patent: Jun. 3, 2025

(54) STORAGE, RENDERING, AND DISPLAY OF INFORMATION OF MESHES THROUGH TESSELLATION WITH SERIALIZED VALUES

(71) Applicant: 3SHAPE A/S, Copenhagen K (DK)

(72) Inventors: Marek Krzysztof Misztal, Copenhagen K (DK); Henrik Öjelund, Copenhagen Ø (DK); Zenjie Li, Vallensbæk Strand (DK)

(73) Assignee: 3SHAPE A/S, Kobenhavn K (DK)

( * ) Notice: Subject to any disclaimer, the term of this patent is extended or adjusted under 35 U.S.C. 154(b) by 111 days.

(21) Appl. No.: 17/912,720

(22) PCT Filed: Mar. 19, 2021

(86) PCT No.: PCT/EP2021/057093
§ 371 (c)(1),
(2) Date: Sep. 19, 2022

(87) PCT Pub. No.: WO2021/186034
PCT Pub. Date: Sep. 23, 2021

(65) Prior Publication Data
US 2023/0138291 A1    May 4, 2023

(30) Foreign Application Priority Data

Mar. 20, 2020  (DK) .............................. PA202070174

(51) Int. Cl.
*G06T 17/20*  (2006.01)
*G06T 7/90*  (2017.01)

(52) U.S. Cl.
CPC ................. *G06T 17/20* (2013.01); *G06T 7/90* (2017.01)

(58) Field of Classification Search
None
See application file for complete search history.

(56) References Cited

U.S. PATENT DOCUMENTS

| 5,377,320 | A | * | 12/1994 | Abi-Ezzi | G06T 17/20 345/419 |
| 5,793,371 | A | * | 8/1998 | Deering | G06T 9/001 708/203 |
| 6,437,779 | B1 | * | 8/2002 | Saito | G06T 17/00 345/420 |
| RE42,406 | E | * | 5/2011 | Kato | G06T 17/20 345/428 |
| 2005/0093873 | A1 | * | 5/2005 | Paltashev | G06T 9/00 345/581 |

(Continued)

OTHER PUBLICATIONS

Gu, Xianfeng, et al "Geometry Images", ACM Transactions on Graphics, ACM, NY, USA, vol. 21, No. 3, Jul. 2002, pp. 355-361, XP058167766.

(Continued)

*Primary Examiner* — Jason A Pringle-Parker
(74) *Attorney, Agent, or Firm* — Buchanan Ingersoll & Rooney PC

(57) ABSTRACT

Disclosed is a method of storing information in a mesh, including tessellating a plurality of input patches of the mesh, serializing vertices of the tessellated input patches, calculating a value for each vertex, serializing the values according to the serialization of the vertices; and storing the serialized values.

10 Claims, 16 Drawing Sheets

(56) References Cited

U.S. PATENT DOCUMENTS

| | | | |
|---|---|---|---|
| 2006/0221076 A1* | 10/2006 | Takahashi | G06T 13/20 345/427 |
| 2008/0266287 A1* | 10/2008 | Ramey | G06T 15/005 345/419 |
| 2009/0153570 A1* | 6/2009 | Jiao | G06T 15/005 345/501 |
| 2011/0090220 A1* | 4/2011 | Molnar | G06T 15/005 345/420 |
| 2011/0310102 A1 | 12/2011 | Chang | |
| 2012/0306875 A1 | 12/2012 | Cai et al. | |
| 2014/0022264 A1* | 1/2014 | Shreiner | G06T 17/20 345/520 |
| 2014/0098117 A1 | 4/2014 | Goel et al. | |
| 2016/0093088 A1* | 3/2016 | Shreiner | G06T 15/005 345/423 |
| 2020/0286261 A1* | 9/2020 | Faramarzi | G06T 9/001 |

OTHER PUBLICATIONS

Lambert et al. "Multi-Resolution Meshes for Feature-Aware Hardware Tessellation" May 2016, Computer Graphics Forum, vol. 35, No. 2, pp. 253-262, ISSN 0167-7055.

Schäfer et al. "Multiresolution Attributes for Hardware Tessellated Objects", IEEE Transactions on Visualization and Computer Graphics, Sep. 2013, vol. 19, No. 9, pp. 1488-1498, ISSN 1077-2626.

Office Action issued on Sep. 18, 2020, by the Danish Patent Office in corresponding Danish Patent Application No. PA 2020 70174. (9 pages).

"Graphics Pipeline", Microsoft, https://docs.microsoft.com/en-us/windows/win32/direct3d11/overviews-direct3d-11-graphics-pipeline, May 31, 2018. (3 pages).

"How triangle patch tessellation is done using edge and inner tessellation factors?" https://stackoverflow.com/questions/37647181/how-triangle-patch-tessellation-is-done-using-edge-and-inner-tessellation-factor, Jun. 5, 2016. (3 pages).

"Rendering Pipeline Overview", OpenGL, https://www.khronos.org/opengl/wiki/Rendering_Pipeline_Overview, Apr. 8, 2019. (7 pages).

"Tessellation", OpenGL, https://www.khronos.org/opengl/wiki/Tessellation, Dec. 31, 2019. (13 pages).

Hoppe, Hugues, "Optimization of mesh locality for transparent vertex caching", In Proceedings of the 26th Annual Conference on Computer Graphics and Interactive Techniques, pp. 269-276, 1999. (8 pages).

International Search Report (PCT/ISA/210) and Written Opinion (PCT/ISA/237) mailed on Aug. 19, 2021, by the European Patent Office as the International Searching Authority for International Application No. PCT/EP2021/057093. (17 pages).

Wiegand, Thomas and Schwarz, Heiko; "Chapter 3.5 Probability Interval Partitioning Entropy Coding" from "Source Coding: Part I of Fundamentals of Source and Video Coding", available at http://iphome.hhi.de/wiegand/assets/pdfs/VBpart1.pdf, 2011. (224 pages).

* cited by examiner

FIG. 2
FIG. 2A
FIG. 2B
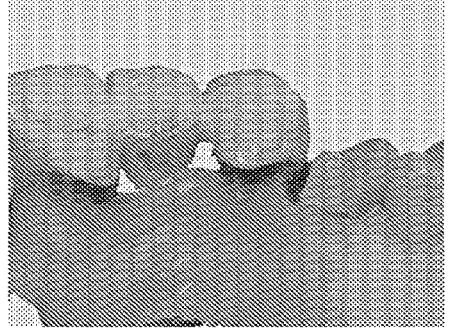
FIG. 2C
FIG. 2D
FIG. 2E
FIG. 2F

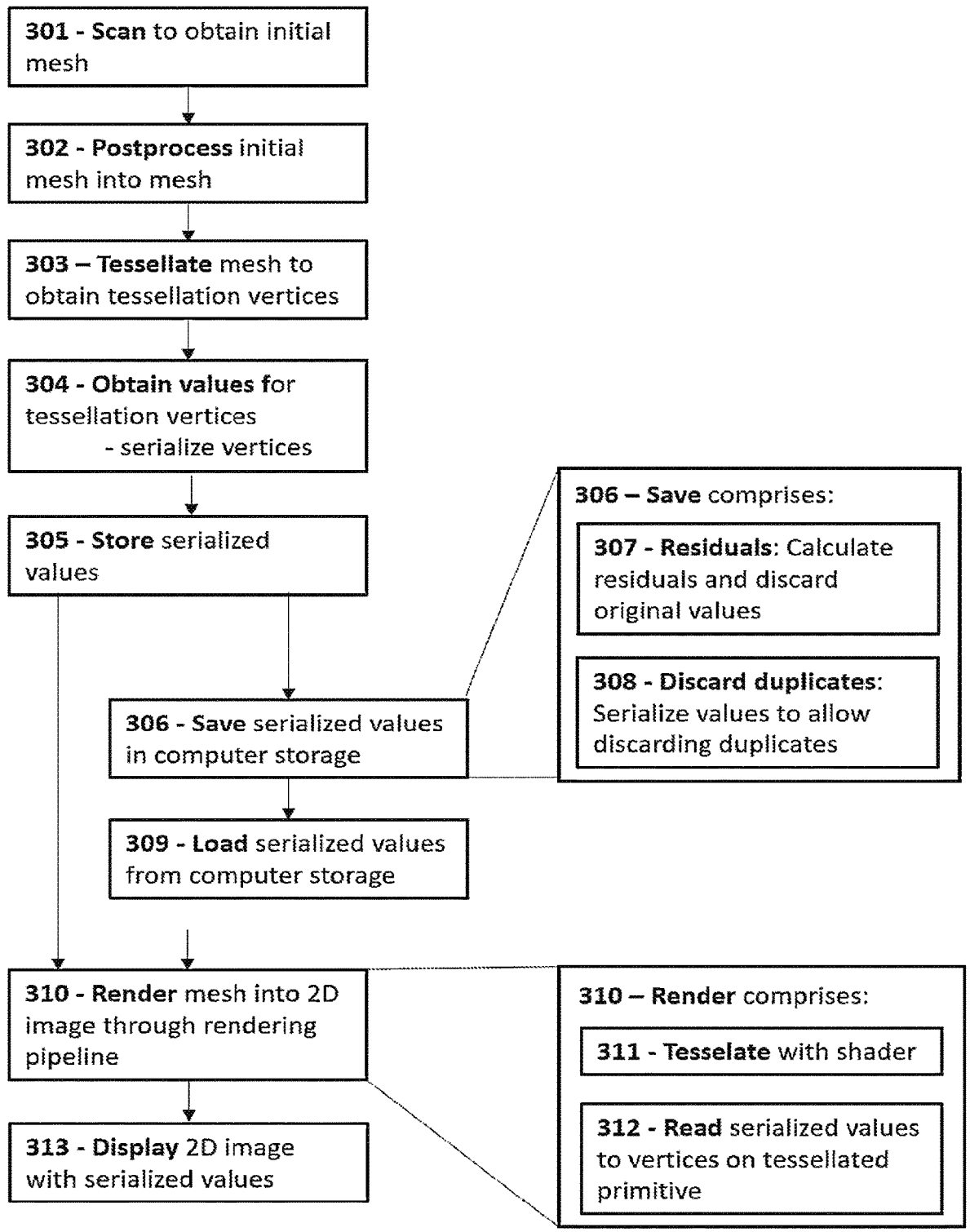

FIG. 4
FIG. 4A
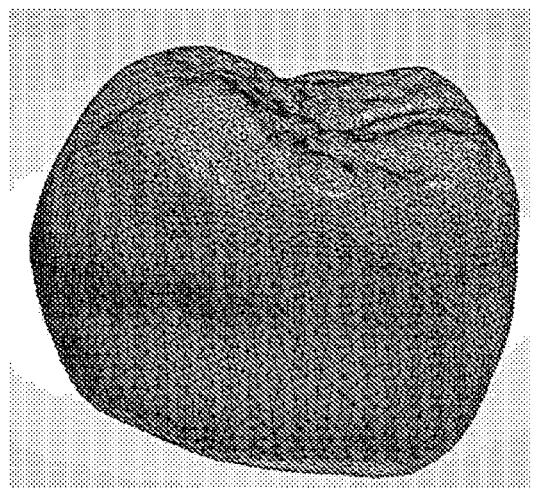
FIG. 4B
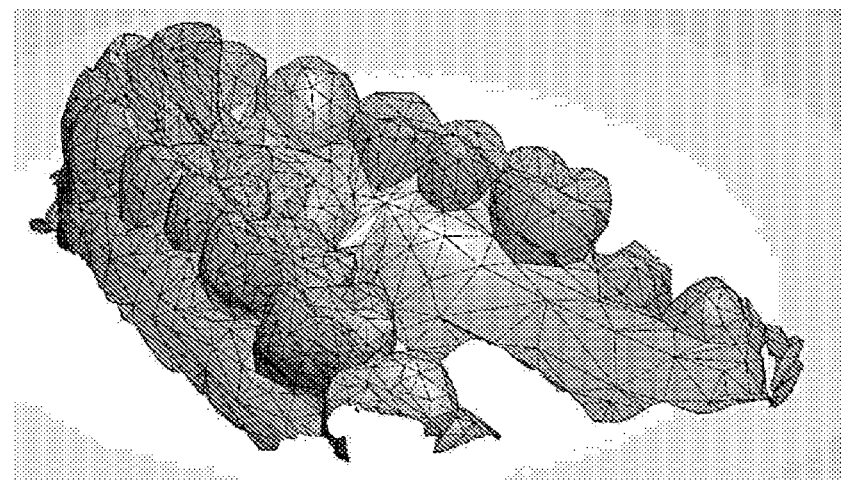

FIG. 5
FIG. 5A
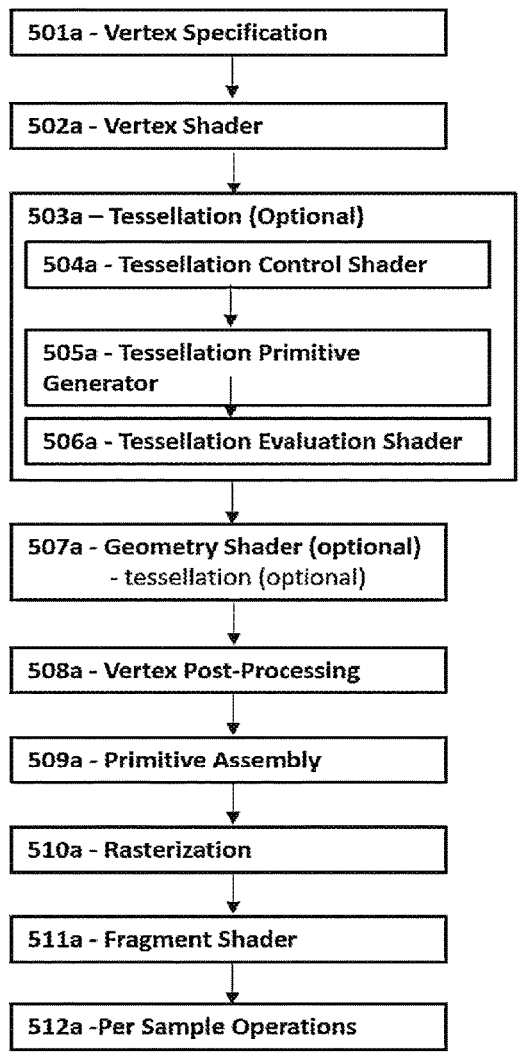
FIG. 5B
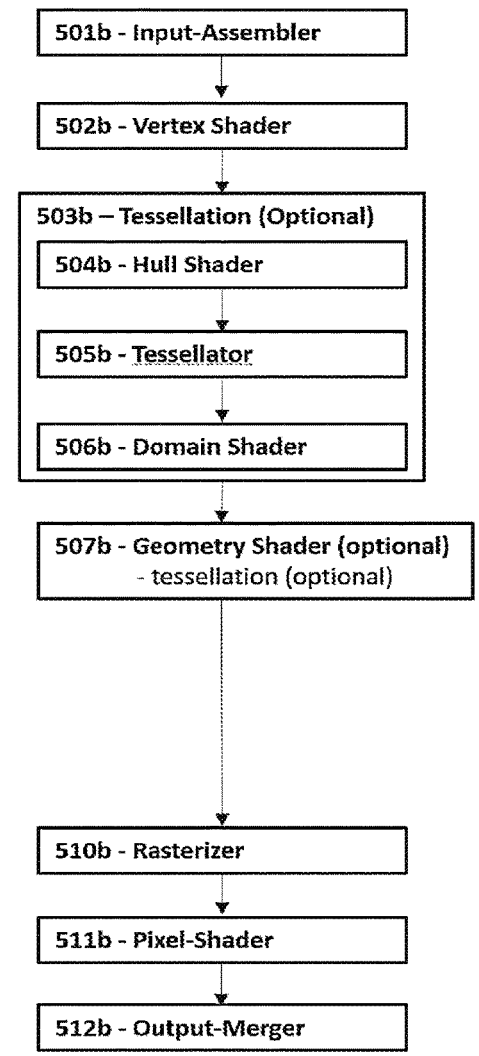

FIG. 9
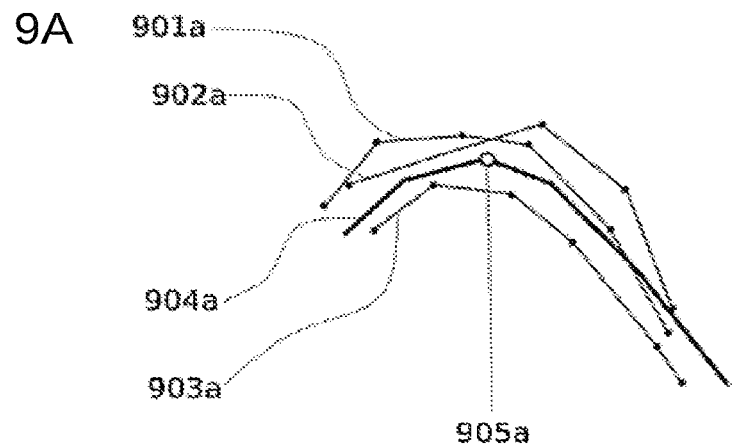
9A
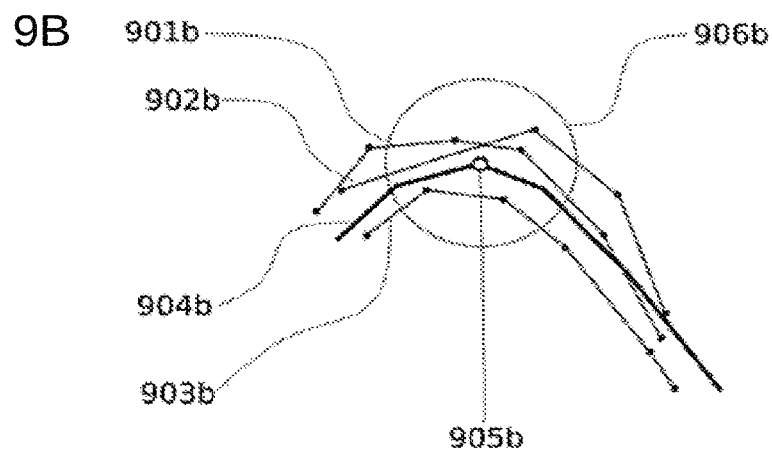
9B
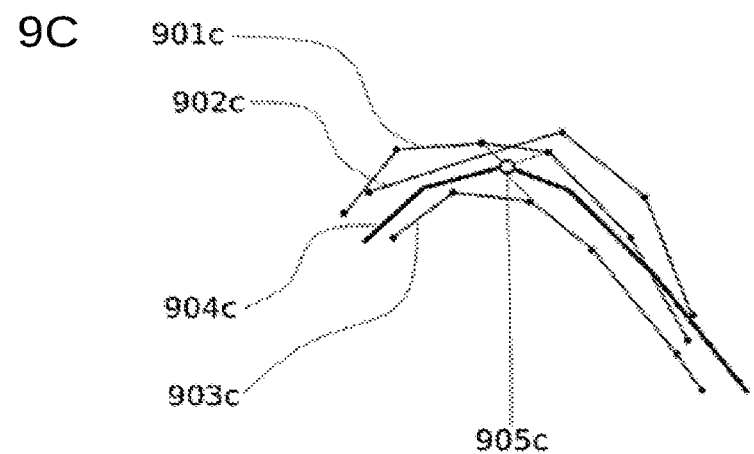
9C

FIG. 10
FIG. 10A
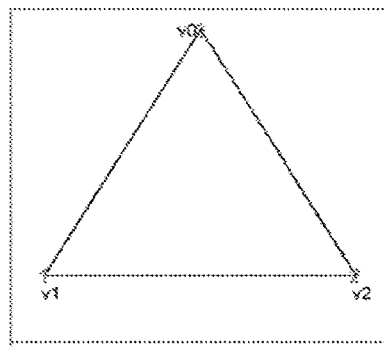
FIG. 10B
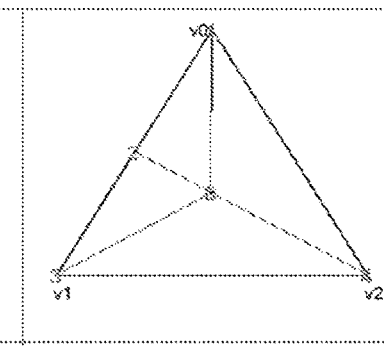
FIG. 10C
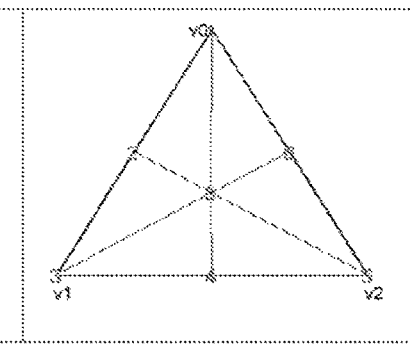
FIG. 10D
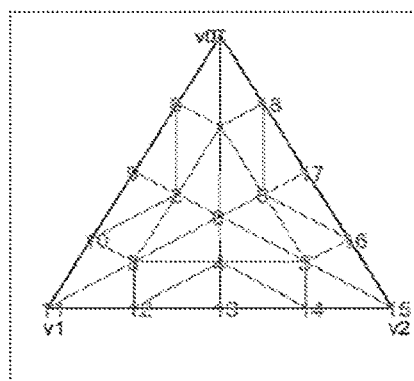
FIG. 10E
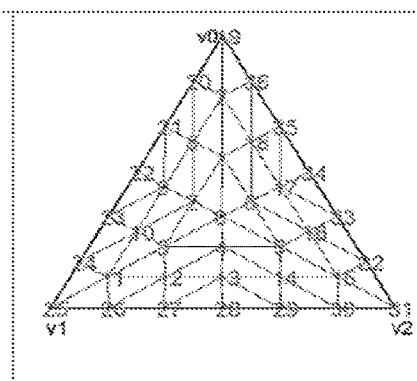
FIG. 10F
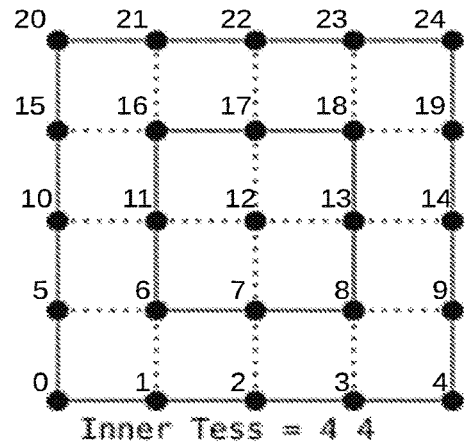
FIG. 10G
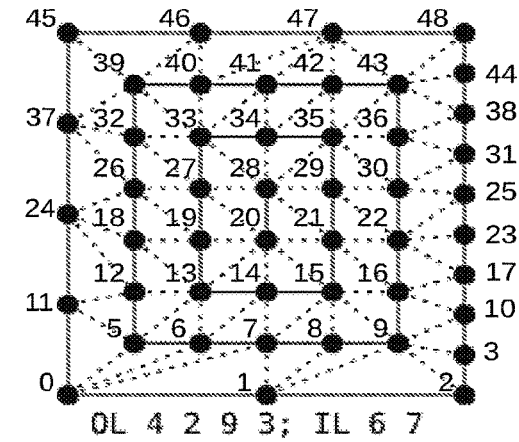

FIG. 11
1100 – Save
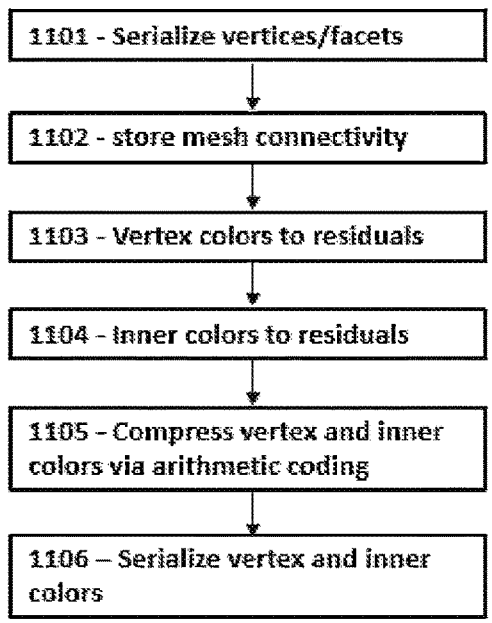
1110 – Load
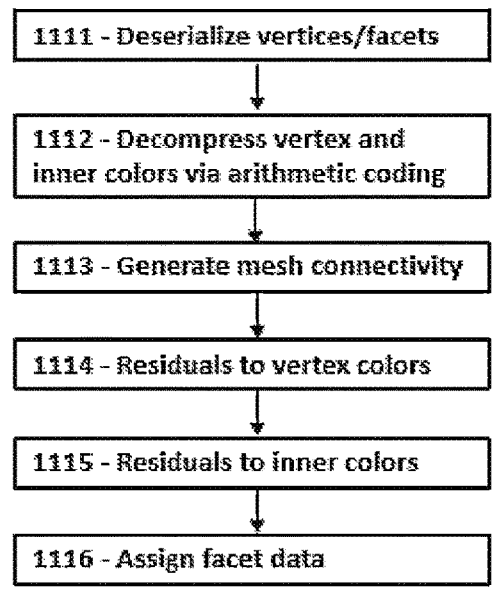

FIG. 12

1200 – Mesh vertex colors

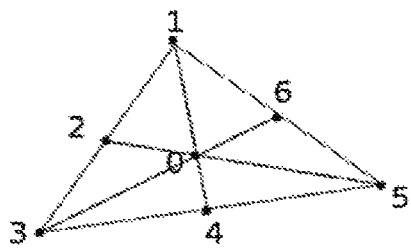

1210 – Serialized color values

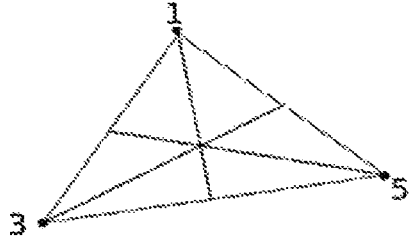

1201
Data structure of higher resolution mesh

```
Vertex0
{
        Position0
        Color0
}
Vertex1
{
        Position1
        Color1
}
Vertex2
{
        Position2
        Color2
}
Vertex3
{
        Position3
        Color3
}
Vertex4
{
        Position4
        Color4
}
Vertex5
{
        Position5
        Color5
}
Vertex6
{
        Position6
        Color6
}
```

1211
Data structure of tesselation

```
Vertex1
{
        Position1
        [Color0, Color1,
         Color2, Color3,
         Color4, Color5,
         Color6]
}
Vertex3
{
        Position3
}
Vertex5
{
        Position5
}
```

FIG. 13
1300 - Original color values
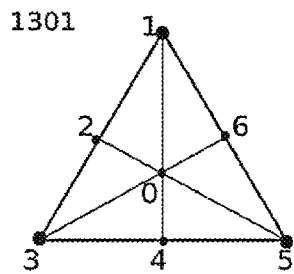
1302 - Original Colors (RGB)
0: [251,243,240]
1: [246,237,237]
2: [252,245,241]
3: [255,249,243]
4: [255,250,242]
5: [254,253,241]
6: [252,253,239]
1310 - Colors from barycentric interpolation
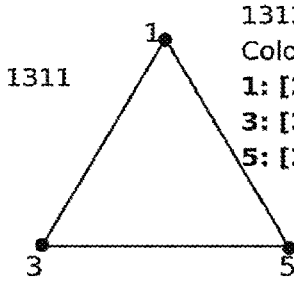
1312 - Original Vertex Colors (RGB)
1: [246,237,237]
3: [255,249,243]
5: [254,253,241]
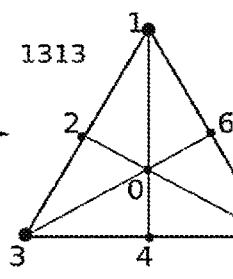
1314 - Barycentric coordinates
0: [$^1/_3$, $^1/_3$, $^1/_3$]
1: [0,1,0]
2: [$^1/_2$, $^1/_2$, 0]
3: [1,0,0]
4: [$^1/_2$, 0, $^1/_2$]
5: [0,0,1]
6: [0, $^1/_2$, $^1/_2$]
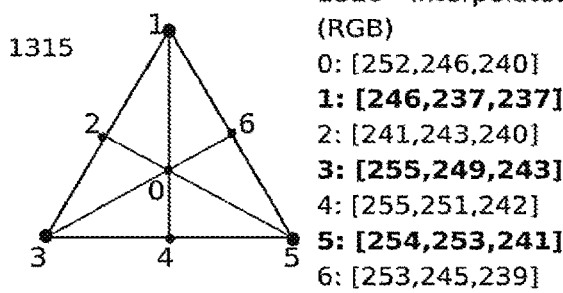
1316 - Interpolated Colors (RGB)
0: [252,246,240]
1: [246,237,237]
2: [241,243,240]
3: [255,249,243]
4: [255,251,242]
5: [254,253,241]
6: [253,245,239]
1320 - Storing residuals of color values
| 1322 - Original Colors (RGB) | 1326 - Interpolated Colors (RGB) | 1327 - Residual Colors (RGB) |
|---|---|---|
| 0: [251,243,240] | 0: [252,246,240] | 0: [-1,-3,0] |
| 1: [246,237,237] − | 1: [246,237,237] = | 1: [0,0,0] |
| 2: [252,245,241] | 2: [241,243,240] | 2: [9,2,1] |
| 3: [255,249,243] | 3: [255,249,243] | 3: [0,0,0] |
| 4: [255,250,242] | 4: [255,251,242] | 4: [0,-1,0] |
| 5: [254,253,241] | 5: [254,253,241] | 5: [0,0,0] |
| 6: [252,253,239] | 6: [253,245,239] | 6: [-1,8,0] |

FIG. 14
FIG. 14A
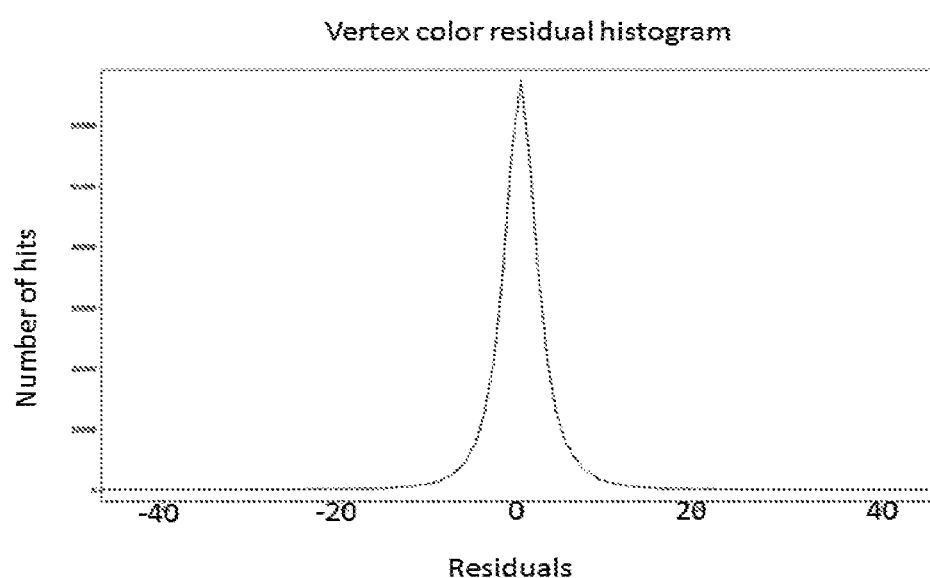
FIG. 14B
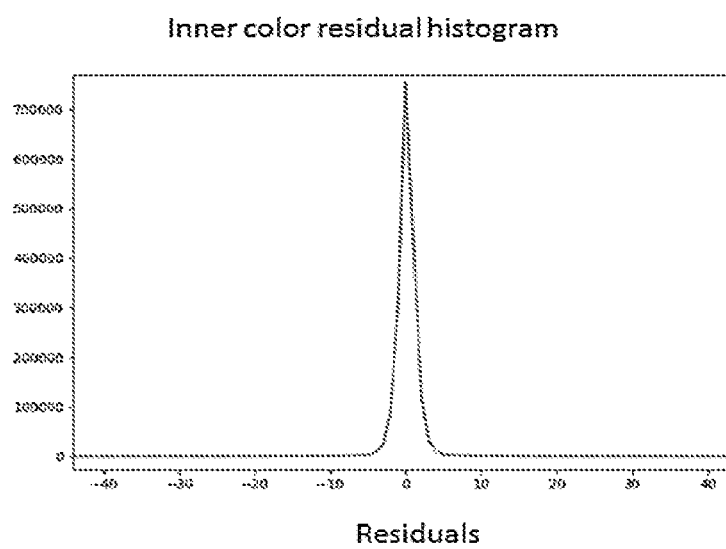

FIG. 15
FIG. 15A
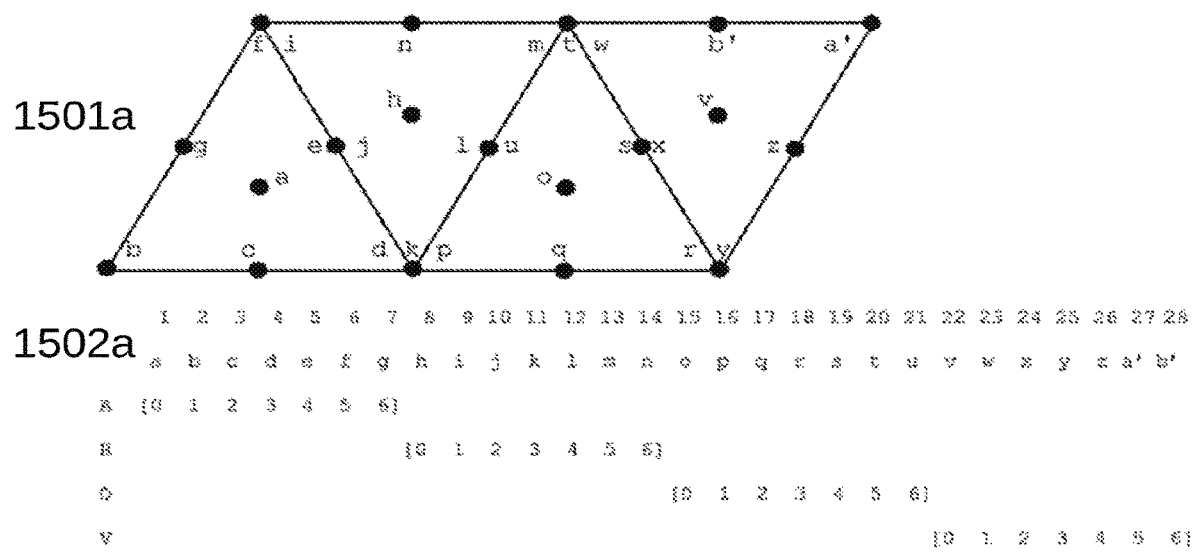
FIG. 15B
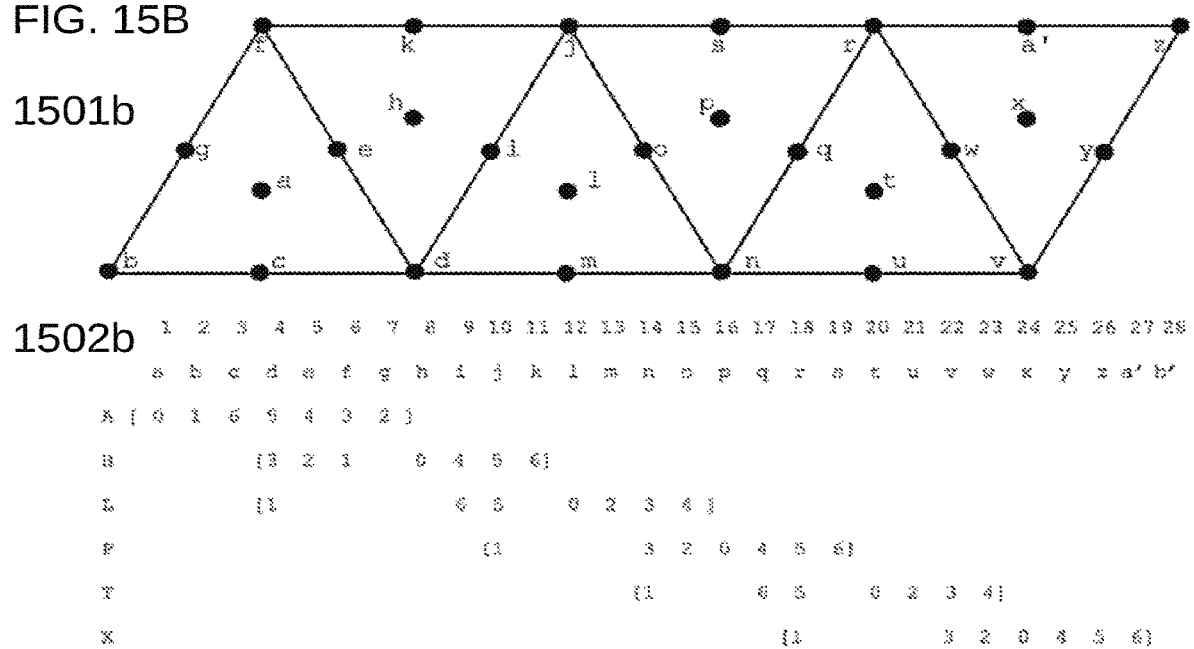

1601 resolution 1
1602 resolution 2
1603 resolution 4

1604

| File size (kB) | No color | Texture mapping, resolution 1 | Tessellation colors, resolution 1 | Tessellation colors, resolution 2 | Tessellation colors, resolution 4 |
|---|---|---|---|---|---|
| Total File Size | 2286 | 3314 | 2518 | 3241 | 5668 |
| Used by colors (kB) | 0 | 1028 | 232 | 955 | 3382 |

STORAGE, RENDERING, AND DISPLAY OF INFORMATION OF MESHES THROUGH TESSELLATION WITH SERIALIZED VALUES

FIELD

This invention generally relates to a system and method for storing and displaying information for a mesh efficiently and accurately through tessellation.

BACKGROUND

In three-dimensional renderings of three-dimensional objects, details can be important. For example, in dentistry, a change of color in teeth or gums can indicate a change in clinical condition. A small crevice may be the beginning of a serious dental problem. Unfortunately, these details can be expensive to store, display, and render.

SUMMARY

This disclosure comprises a method of storing information in a mesh, comprising:
  tessellating a plurality of input patches of the mesh, wherein tessellating produces at least one tessellation vertex for each of the plurality of input patches;
  serializing vertices of the tessellated input patches;
  calculating a value for each vertex;
  serializing the values according to the serialization of the vertices; and
  storing the serialized values.

This disclosure is method of storing information in a mesh, such that it can be stored, rendered, and displayed in an efficient and accurate manner.

A mesh is a collection of vertices, edges, and faces. Vertices are individual points representing the surface, edges are lines connecting the vertices, and faces are continuous areas surrounded by vertices and edges. A mesh may represent an underlying object, for example, a 3D model representing a tooth, or a 2D model representing a jaw. FIG. 4 shows examples of meshes.

Meshes can represent two-dimensional (2D) or three dimensional (3D) objects. Popular file formats for 3D meshes include: Collaborative Design Activity (COLLADA), Initial Graphics Exchange Specification (IGES), ISO 10303 (STEP), STL, Virtual Reality Modeling Language (VRML). These file formats comprise data structures that may, for example, instruct a computer on how to construct the mesh model.

A data structure here is understood to have its common meaning in computer science, that is, a format to store data that allows access and/or modification. Data structures may include, for example, lists, tuples, dictionaries, arrays, trees, etc. To store a 3D mesh, a data structure should store information about its vertices, how the vertices are connected by the edges, and the placement of each face based on these vertices.

In an embodiment, the data structure associated with a mesh model is modified to store additional information as serialized values that may be accessed through tessellation. Information may be a property of the underlying object, which may be associated a numerical value. Examples of information include the shape and/or color of an underlying object.

One way to add information to a mesh is by using a higher resolution mesh, i.e. adding more vertices an edges to the mesh. A higher resolution mesh may take a larger file size. This may not be desirable where the rendering must be done quickly, for example, where a user is zooming in and out in real time to show a patient details of a scan. Further, a larger file size may be slow to upload or download, and cost more in cloud storage. This is of particular concern where there are many files.

Another method to display more information in a mesh is tessellation. Tessellation divides a patch of a mesh into smaller pieces, adding complexity to that patch. Tessellation allows the parallelization of the computer processes necessary to render a mesh, which reduces the time needed. This allows detail to be dynamically added and removed in real time. For example, a user looking at a 3D object may zoom in and out, and the shader can add in detail to keep the object looking smooth on the screen. FIG. 6 below shows an example of tessellation of a single facet.

An embodiment of tessellation is described in detail in FIG. 6, but in summary: Tessellation takes an input patch, i.e. an area of a mesh, and converts it to a primitive, i.e. standard shape. The primitive may then be subdivided based on tessellation parameters, which control the tessellation. This subdivision may be done by generating tessellation vertices, i.e. new vertices created by the tessellation, and connecting mesh vertices (i.e. existing vertices on the mesh) and/or tessellation vertices with edges into faces. The tessellation vertices are then projected back on to the input patch. Because of the standard shape, operations may be done on many of the tessellated primitives in parallel.

Computer hardware may have embedded systems to assist in tessellation because of how well it works. For example, most Nvidia chips allow tessellation. When rendered, tessellation may be performed by CPU and/or GPU. Tessellation may also be done in software. Tessellation may be part of a rendering pipeline, as described in FIG. 5.

Tessellation, however, is typically used to estimate new values. This is acceptable for applications such as video games, where the model merely needs to look plausible. For clinical applications, however, estimation may be insufficient.

This disclosure may allow for the storage, rendering, and display of true/known information for a mesh by serializing the vertices from the tessellated input patches, calculating values for those vertices, and then storing the serialized values. This allows information about the mesh to be reconstructed with tessellation, as described below.

The disclosure further comprises serializing the vertices of the tessellated input patch, where the vertices comprise mesh vertices and tessellation vertices. Serialization orders the vertices in the same way for each tessellation. Embodiments for serializing vertices include: calculating a number based on tessellation parameters, converting coordinates to a number. Details are described below and in FIG. 10.

A value is then calculated for each serialized vertex. This may be done, for example, by comparing values from nearby vertices, as described in FIG. 9. The values are then serialized according the serialization order of the vertices, and the serialized values are stored.

The values may contain, for example, color information and/or geometric information. An embodiment where the values have color information and are color values is described below.

An embodiment where the values have geometric information and may be three-dimensional Euclidean coordinates may further comprise Euclidean coordinates and/or displacements of Euclidean coordinates. This may allow for example, for further detail from a scan to be stored in a mesh with lower resolution than the scan. For a dental model, the initial display of the scan may need only a certain resolution, but zooming in may require greater detail of the surface. Storing serialized values with additional geometric information may allow this.

An embodiment further comprises a method where serializing comprises generating a serialization order based on coordinates.

One method of generating a serialization order, i.e. the order the vertices are serialized in, is to base the order on coordinates on the primitive. Coordinates may be a number or a set of numbers used to describe a location. Examples of coordinates comprise: barycentric coordinates, Euclidean coordinates, Cartesian coordinates.

In an embodiment, barycentric coordinates for a triangular primitive may be converted into a serialization order. In another embodiment, Euclidean coordinates for a quadrilateral primitive may be converted into a serialization order. Details are in FIG. 10.

An embodiment comprises a method where serializing further comprises generating serialized numbers according to at least one tessellation parameter.

The serialization order may also be based off the parameters used to tessellate the primitive.

An embodiment further comprises a method where the value is a color value.

An embodiment is of a method of using color in a mesh, such that it can be quickly, accurately, and efficiently stored, rendered, and displayed.

A mesh by itself may typically store geometric information, that is, information about how the underlying object is shaped. In an embodiment, the data structure associated with a mesh model is modified to store information about the color of the underlying object as well.

Color is a visual characteristic. Color values are a systematic way to express what a color is, for example, red green blue values (RGB), decimal values, hexadecimal values, cyan magenta yellow key values (CMYK), or a color library such as the Pantone library.

A typical way to add color information to a mesh is by texture mapping. Texture mapping comprises generating a two dimensional texture, then mapping it to the mesh by matching particular points on the texture to particular points on the mesh. It can be envisioned as a digital version of a vinyl wrap for a car.

Texture mapping, however, is expensive in both storage and computation. First, the texture must be stored as a separate object, increasing the file size. Fitting the texture to the mesh takes computing time and processing power. Further, texture mapping may result in serious distortions of the actual color.

Another way to add color information to a mesh is to store the color information directly in the mesh. This is usually done by storing the color information in the vertices. However, here, only the color at the vertices is stored. For closer viewing, either the mesh must be of high enough resolution to provide sufficient color information, or the colors must be extrapolated.

A higher resolution mesh may take a larger file size. This may not be desirable where the rendering must be done quickly, for example, where a user is zooming in and out in real time to show a patient details of a scan. Further, a larger file size may be slow to upload or download, and cost more in cloud storage. This is of particular concern where there are many files.

One method to display more information in a mesh is tessellation. Tessellation divides a patch of a mesh into smaller pieces, adding complexity to that patch. Tessellation allows the parallelization of the computer processes necessary to render a mesh, which reduces the time needed. This allows detail to be dynamically added and removed in real time. For example, a user looking at a 3D object may zoom in and out, and the shader can add in detail to keep the object looking smooth on the screen. FIG. 6 below shows an example of tessellation of a single facet.

Computer hardware may have embedded systems to assist in tessellation because of how well it works. For example, most Nvidia chips allow tessellation. Tessellation may also be done by software.

In an embodiment, tessellation projects each face of a triangular mesh onto an equilateral triangle. As the faces are now uniform, different operations may be performed quickly across all of them. For example, a lower resolution mesh may look blocky when rendered on a screen. Tessellation can extrapolate the geometry for each facet, such that the surface appears curved when rendered.

A mesh, as stored, however, is not immediately visible to humans. Rendering a mesh prepares the mesh for display, for example, on a screen. A rendering pipeline is often used to render a mesh into a 2D image. Tessellation may be done by different processes in a rendering pipeline, for example, the tessellation stage (comprising the hull shader, the tessellator, and the domain shader) or the geometry shader. A shader calculates instructions for every unit at once; this allows them to work very quickly. An overview of rendering pipelines is described below in FIG. 5, for commonly-used rendering pipelines OpenGL and Microsoft Direct3D/DirectX.

A rendering pipeline may include a tessellation stage, comprising a hull shader, a tessellator, and a domain shader (These terms are used in Direct3D; their equivalents in OpenGL may be found in FIG. 5). The hull shader takes as input an initial patch, and projects it to a standard shape, known as the primitive. The hull shader may, for example, match the vertices of the initial patch to the vertices of the primitive. In an embodiment with a triangular mesh, for example, the initial patch may be a triangular facet of the mesh and the primitive may be an equilateral triangle or a quadrilateral. The input patch need not match the mesh facets, as it is defined by the user.

The hull shader is also where information about the parameters of the tessellation is entered, for example, inner tessellation factors, outer tessellation factors, and/or geometry information, as discussed below.

Next, the tessellator takes as input the primitive from the hull shader, and tessellates it based on the parameters entered into the hull shader. To tessellate a primitive here is given its general understanding in graphics rendering, that is, breaking up a primitive into smaller, predictable pieces and generated a set of tessellation vertices and tessellation edges to define these smaller pieces.

Tessellation parameters can help define how the tessellation is executed. For example, the parameters might be an inner tessellation factor that defines how many concentric shapes are inside the original primitive and/or whether or not there is a central vertex, and an outer tessellation factor to determine how many vertices to add to each edge. Further parameters might specify the spacing of the vertices generated by tessellation. Examples of tessellation parameters for triangular primitives are explained in further detail in FIG. 10.

The tessellator outputs a set of coordinates that can be mapped back on to the original input patch. These coordinates may be the basis for tessellation vertices.

For a triangular primitive, for example, barycentric coordinates may be used. Barycentric coordinates are a coordinate system that defines places on a triangle relative to the center of the triangle, rather than in absolute distances. Each barycentric coordinate corresponds to a location on the initial face. Further, a set of tessellation vertices based on these barycentric coordinates may be serialized, that is, operated on in the same order every time. Examples of such numbering are shown in FIG. 10

For a quadrilateral primitive, a unit square might be used, where one corner of the square is set to (0,0) and an opposite corner to (1,1). This can then be mapped back on to any quadrilateral.

Next, a domain shader takes as input the barycentric coordinates from the tessellator and performs calculations on then such as interpolating geometric information about the object, then projects the calculated results back on to the original face using the coordinates from the tessellator. Points located at these coordinates may be regarded as vertices generated by the tessellation, i.e. tessellation vertices. Tessellation vertices may be distinct from mesh vertices in that they are generated by the tessellation and do not exist in the original mesh.

Tessellation may also be done by the geometry shader.

In this disclosure, tessellation may store color information more efficiently than a higher-resolution mesh or a texture-mapped mesh. As the embodiment serializes the at least one tessellation vertex in the same order each time, the color value for the at least one face may be serialized and stored, for example, as a list attached to a mesh vertex or associated with a facet.

In an embodiment, the color values are stored in a mesh model by tessellating a plurality of the faces of the mesh model, which produces at least one tessellation vertex each face.

A color value is then calculated for each tessellation vertex. This may be done, for example, by comparing color values from nearby vertices, as described in FIG. 9.

As the vertices on the tessellated input patch are always serialized in the same order, the color values may be serialized in that order and stored. If the mesh is then tessellated again later, the color values can be reassigned to the correct tessellation vertices. Information about the tessellation vertices themselves need not be stored, only the parameters used to calculate them.

By storing color information in this way, the mesh model requires less data storage than a mesh with a texture map for the same color information stored. For example, a file size for set of dentition for the texture map is 3314 kB, while the file size for a mesh model with serialized color values of the same color resolution is 2518 kB. See FIG. 16. This also allows it to be rendered quickly as needed, by using tessellation.

In an embodiment in the dental field, a mesh may be a dental model, a representation of the patient's oral situation, including but not limited to teeth, gums, and/or dental objects. In this case, the mesh may contain information about the clinical condition of the patient and it may be desirable reflect the actual color of the patient's oral situation as accurately as possible.

An embodiment further comprises rendering the mesh using the serialized values.

As discussed above, a mesh, as stored, is not immediately visible to humans. Rendering a mesh prepares the mesh for display, for example, on a screen. A rendering pipeline may be used to render a mesh into a 2D image ready for display.

In an embodiment, rendering the mesh with the serialized values adds a higher resolution of values than the mesh itself would allow. Rendering may further comprise rasterizing, i.e. taking available information from the mesh to calculated what to display on each pixel of a screen. It may also comprise a pixel shader. Examples of rendering pipelines are described in more detail in FIG. 5 below.

This disclosure allows for the underlying object to be rendered more accurately, in that the values used are closer to the true values of the underlying object. Further, the disclosure allows for the rendering pipeline itself to display the same number of values more efficiently compared to a higher resolution mesh.

An embodiment further comprises where the mesh model is based on a three-dimensional object.

A three-dimensional object is an object that exists in three dimensions. In various embodiments of this disclosure, three-dimensional objects include, but are not limited to: physical objects such as dental restorations and dentition, digital objects such as models of individual teeth and scans of physical objects such as dental restorations and ears.

[Claim] An embodiment further comprises generating the mesh based on a plurality of subcomponents.

A mesh may be generated from a plurality of subcomponents. For example, the mesh may be a dental model based on a plurality of 3D subscans, which are aligned and then processed into one continuous mesh. A scanner may only be able to scan a small part of the mouth at once; aligning these pieces allows a model of the entire mouth to be made. Subscans may have information about the geometry and/or the color of the scanned object. Alignment may be done by known processes, for example, by iterative closest alignment algorithms.

Once the subscans are aligned, a mesh may be generated based on data points from the subscans by, for example: selecting points at regular intervals on the surface of the aligned subscans and calculating the average of the nearest subscan vertices; combining neighboring vertices of the aligned subscans. Post processing may be done, for example, by mesh decimation to reduce redundant data points, or to smooth the mesh overall. However, the subcomponents may still be retained for the information they contain.

An embodiment further comprises deriving at least one value for a point on the mesh.

In tessellation, further information may be interpolated, that is, estimated. This may be useful for applications such as video games, where fictional details are filled in. However, for clinical applications, accurately reflecting the true values of an underlying object may be preferred. Hence, a value may be derived rather than interpolated.

In one embodiment, a mesh may be derived from subscans, where each subscan is comprised of vertices with location information (e.g. cartesian or Euclidean coordinates) and color information (e.g. color values such as RGB and/or hexadecimal colors).

In an embodiment, for a point on the mesh or within 1 mm of the mesh (e.g. a mesh vertex, a tessellation vertex, and/or another point nearby), the point's value may be derived by using the value from the nearest subscan vertex. Nearness may calculated by taking the shortest Euclidean distance between the point on the mesh model and the vertices of the subcomponent. This means that the value may be a reflection of the true value of the underlying object, rather than a guess.

In an embodiment, for the point on the mesh, the value is based the values of a plurality of nearest neighbors, i.e. a plurality of submesh vertices that are nearest to the point. The nearest neighbors may be calculated as k nearest neighbors, where k is a positive integer and is the number of nearest neighbors chosen (e.g. 5 or 10 nearest neighbors). The nearest neighbors may also be calculated as a plurality of subcomponent vertices within a given distance from the point on the mesh, e.g. within 1 mm of the mesh.

The values of the nearest neighbors may be weighted proportionate to distance, where subcomponent vertices that are closer are given more weight than those that are further away. In calculating an average or weighted average, outliers may be removed, as well as other statistical analyses that may improve the accuracy of the value for the point on the mesh.

[Claim] The disclosure further comprises saving the serialized values to computer storage.

An embodiment further comprises saving the serialized values to computer storage, allowing for further compression of the file size.

The rendering pipeline described above may be performed in the computer memory alone (see also, FIG. 5 below), and therefore the display of the serialized values may take place in memory alone. Computer memory may be a component that allows short-term data with easy access, e.g. the RAM, DRAM. Computer storage allows storage on a long term basis, and may be, for example, a hard drive, SSD, and/or storage in the cloud.

However, the serialized values may also be saved to storage, allowing for further compression, as described below. See FIG. 3 for a detailed description of storage.

An embodiment further comprises storing the serialized values in a data structure that removes duplicate values of vertices shared between at least two faces.

Duplicate information occurs in a mesh because different faces may share vertices and edges. An embodiment reduces the amount of data storage required by removing these duplicates. In an embodiment, a data structure may contain values from a plurality of faces, and the serialized values may be derived from the data structure. Details are described in FIG. 15.

An embodiment further comprises storing the serialized values as residuals.

In an embodiment, the amount of data storage required to store the values of the mesh is further reduced by storing the residuals of the values rather than the values themselves. A residual may be generally defined as the difference between a predicted value and a observed and/or true value. In a normal statistical plot, this may be, for example, the different between an estimated value and the measured value, for example, the estimated daily high temperature versus the actual temperature measured on that day. The numerical values of residuals are often smaller than the absolute values; for example, if the predicted temperature was 30 degrees, and the actual temperature was 32 degrees, the residual would be 2 degrees.

The value of a given point on a mesh model does not exist in a vacuum; rather, it is often similar to nearby values. In a scan of a tooth, for example, a tooth is not a random mosaic of colors; rather, an off-white spot is likely to be next to another off-white spot, and color changes are often gradual. Abrupt color changes contain their own information—for example, a change from pink to white may mean that the scan has changed from gum to tooth. By storing the difference between these colors rather than the original colors, the amount of data storage required can be reduced.

For example, color values may be stored as red green blue (RGB) values. Colors on the visible spectrum can be defined as a mix between red, green, and blue, typically on a scale of 0 to 255. White may have a color value of (255,255,255), where red, green, and blue are at their maximum. Black may be defined as (0,0,0), the absence of all three colors.

An embodiment takes advantage of the similarities between the colors by storing the difference between the color values of the original mesh vertices and the tessellated vertices, rather than the absolute color values. For example, supposing a vertex color were Pantone 11-0602 TCX Snow White, which has RGB value (242, 240, 235). If a neighboring point were (236, 242, 235), the difference between the two could be expressed as (6, −2, 0), which has 5 fewer characters to store. For further details, see FIG. 13.

An embodiment comprises taking an average of all values of the scan, calculating the difference between a given point and the average, and storing that difference. As discussed below, a single scan may have a very similar range for its color values, and storing the differences takes much less storage space. Example histograms of color values may be seen in FIG. 14.

While this disclosure has so far used RGB values, because they are relatively intuitive and easy to explain, color values may also be stored in other formats, as discussed above.

An embodiment further comprises a computer program product in a non-transitory medium configured to execute one or more of the preceding claims.

BRIEF DESCRIPTION OF THE DRAWINGS

The above and/or additional objects, features and advantages of the present invention, will be further described by the following illustrative and non-limiting detailed description of embodiments of the present invention, with reference to the appended drawing(s), wherein:

FIG. 2 shows examples comparing coloring a mesh using texture mapping versus coloring a mesh using tessellation with serialized color values;

FIG. 2A shows an oral situation displayed using texture mapping and FIG. 2B shows the same oral situation displayed using tessellation with serialized color values;

FIG. 2C shows an oral situation displayed using texture mapping and FIG. 2D shows the same oral situation displayed using tessellation with serialized color values;

FIG. 2E shows an oral situation displayed using texture mapping and FIG. 2F shows the same oral situation displayed using tessellation with serialized color values;

FIG. 3 shows embodiments to store, render, and display colors according to this disclosure;

FIG. 4 shows examples of mesh models;

FIG. 4A is a mesh model of a molar;

FIG. 4B is a mesh model of the lower jaw of an oral situation;

FIG. 5 shows two embodiments of rendering pipelines, OpenGL and Microsoft Direct3D;

FIG. 5A shows an embodiment of the OpenGL rendering pipeline;

FIG. 5B shows an embodiment of the Direct3D rendering pipeline;

FIG. 9 shows embodiments for methods of obtaining values from subcomponents;

FIG. 9A shows aligned subcomponents 901a, 902a, and 903a and mesh 904a;

FIG. 9B shows an embodiment obtaining values from subcomponents using nearest neighbors within a particular distance;

FIG. 9C shows an embodiment obtaining values from subcomponents using a particular number of nearest neighbors;

FIG. 10 shows examples of primitives tessellated with different tessellation parameters, and their respective serialization orders;

FIG. 10A shows an triangular primitive;

FIG. 10B shows a tessellated triangular primitive with an inner tessellation factor of 2, outer tessellation factors of (2, 1, 1), and evenly spaced vertices;

FIG. 10C shows a tessellated triangular primitive with an inner tessellation factor of 2, outer tessellation factors of (2, 2, 2), and evenly spaced vertices;

FIG. 10D shows a tessellated triangular primitive with an inner tessellation factor of 4, outer tessellation factors of (4, 4, 4), and evenly spaced vertices;

FIG. 10E shows a tessellated triangular primitive with inner tessellation factor of 6 and outer tessellation factors of (6, 6, 6), and evenly spaced vertices;

FIG. 10F shows a tessellated quadrilateral primitive with inner tessellation factors (4, 4);

FIG. 10G shows a tessellated quadrilateral primitive with inner tessellation factors (6, 7) and outer tessellation factors (4, 2, 9, 3);

FIG. 11 shows embodiments of saving and loading workflows for a mesh with serialized color values;

FIG. 12 is a toy example of a comparison between the storage required by a mesh with mesh vertex colors and a mesh with serialized color values at the same color resolution;

FIG. 13 is an example of using residuals of interpolated colors;

FIG. 14 shows histograms of color values clustered around an average;

FIG. 14A shows a histogram of the vertex color values found in a typical dental scan;

FIG. 14B shows a histogram of the inner color values found in a typical dental scan;

FIG. 15 shows an embodiment for storing duplicate values more efficiently;

FIG. 15A shows an embodiment where serialized values are saved into a list;

FIG. 15B shows an embodiment where values are saved such that a shared vertex may be accessed again rather than listed again;

DETAILED DESCRIPTION

In the following description, reference is made to the accompanying figures, which show by way of illustration how the invention may be practiced.

Figure 1:
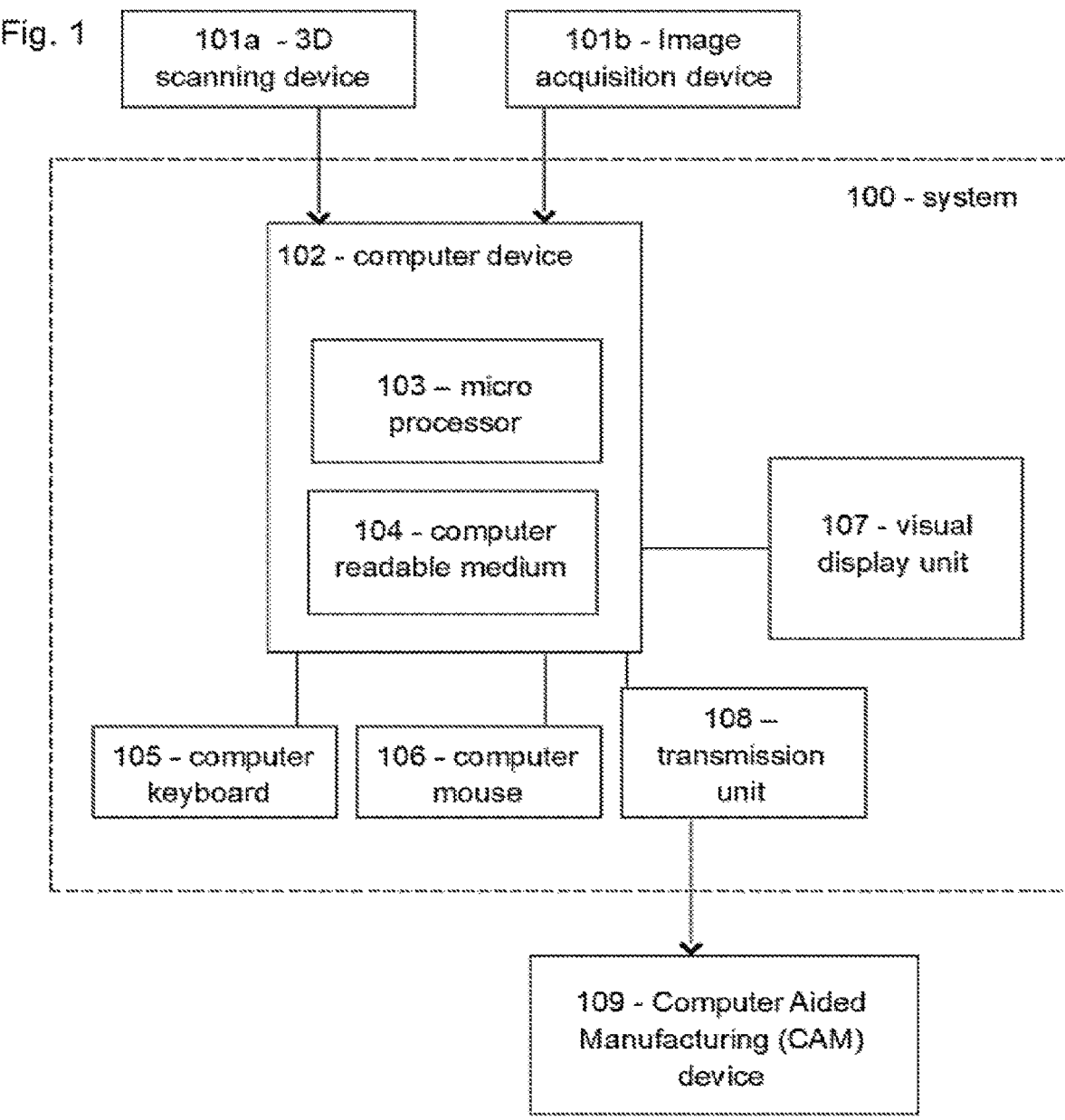
FIG. 1 shows a schematic of a system according to an embodiment of the disclosure.

FIG. 1 shows a schematic of a system according to an embodiment of the disclosure. The system 100 comprises a computer device 102 comprising a computer readable medium 104 and a microprocessor 103. The system further comprises a visual display unit 107, an input unit such as a computer keyboard 105 and a computer mouse 106 for entering data and activating virtual buttons visualized on the visual display unit 107. The visual display unit 107 may for example be a computer screen.

The computer device 102 is capable of obtaining three-dimensional models from a digital modelling device 101b, where a three-dimensional model may be a mesh. Meshes may be stored in the computer readable medium 104 and provided to the processor 103.

Additionally or alternatively, the computer device 102 is further capable of receiving a digital 3D representation, for example, of the surfaces of the patient's set of teeth and gingiva from an image acquisition device 101a, for example a 3D scanning device, such as the TRIOS intra-oral scanner manufactured by 3shape TRIOS A/S, or capable of receiving scan data from such a 3D scanning device and forming a digital 3D representation of the patient's set of teeth and/or gingiva based on such scan data. The received or formed digital 3D representation may also be in the form of a mesh, and can be stored in the computer readable medium 104 and provided to the microprocessor 103.

The system 100 is configured to allow an operator to store and display serialized values through tessellation. This can be realized, for example, by displaying a dental model on the visual display unit 107, and the operator can then visualize the mesh with serialized values on the visual display unit.

The system comprises a unit 108 for storing, rendering and displaying a mesh with serialized values in a digital data format suitable for manufacture to a fabrication machine for generating a dental device to e.g. a computer aided manu-facturing (CAM) device 109 or to another computer system e.g. located at a milling or printing center where the customized dental restorations are manufactured. The unit for transmitting can be a wired or a wireless connection, and the transmission may be done for example using the internet or File Transfer Protocol (FTP).

The scanning for a mesh using the 3D scanning device 101a and/or the modelling for a mesh using the digital modelling device 101b may be performed at a dentist, while the dental device design may be performed at a dental laboratory. In such cases the dental model can be provided via an internet connection between the dentist and the dental laboratory.

The system 100 as shown is an illustrative example. For example, the computer device 102 may comprise more than one micro processor 103 and/or more than one computer readable medium 104, the visual display unit 107 may be integrated in the computer device 102 or be separate from the computer device 102, etc.

FIG. 2 shows examples comparing coloring a mesh using texture mapping versus coloring a mesh using tessellation with serialized color values.

FIG. 2A shows an oral situation displayed using texture mapping and FIG. 2B shows the same oral situation displayed using tessellation with serialized color values. The colors in FIG. 2B more accurately reflect the true colors of the oral situation, in both color value and location, as compared to FIG. 2A. For example, in FIG. 2A, the second tooth from the left that appear as streaks of an brown/crimson color. These may be interpreted as tooth discoloration, based on their shape and color. FIG. 2B shows the same tooth with less distortion in both shape and color, accurately showing that the "stain" is an irregular shape and a brighter vivid red. Removing distortion may allow a more accurate interpretation as a temporary spot of blood, perhaps from a dental procedure. As blood stains are ephemeral, FIG. 2B allows the color to be ignored as temporary, unlike FIG. 2A, which to an interpretation that the color is a fixed stain.

FIG. 2C shows an oral situation displayed using texture mapping and FIG. 2D shows the same oral situation displayed using tessellation with serialized color values. The colors in FIG. 2D more accurately reflect the true colors of the oral situation, in both color value and location, as compared to FIG. 2C.

For example, the tooth at the center of FIG. 2C and FIG. 2D has a metal post in preparation for a crown. FIG. 2C shows the colors on the metal post as having horizontal streaks. FIG. 2D, shows the same post with less distortion in both shape and color, revealing the "streaks" to be numbers and letters on the post.

FIG. 2E shows an oral situation displayed using texture mapping and FIG. 2F shows the same oral situation displayed using tessellation with serialized color values. The colors in FIG. 2F more accurately reflect the true colors of the oral situation, in both color value and location, as compared to FIG. 2E.

For example, in the oral situation in FIGS. 2E and 2F, the patient has been sutured. The more accurate colors and location of colors from FIG. 2F may allow for better monitoring of the suture site, for example, in monitoring the inflammation of the gums. Note that in FIG. 2F, the suture's entry points are a more vivid red and the underlying capillaries of the gum are more visible than the corresponding features in FIG. 2E.

FIG. 3 shows embodiments to store, render, and display additional information through serialized values according to this disclosure.

Step 301 comprises scanning to obtain an initial mesh. The initial mesh may be, for example, comprised of multiple subscans that are then combined into a single scan. The initial mesh may indicate, for example, only the shape (i.e. geometry) of the model. It may have no other information on the model, including color information.

Step 302 comprises postprocessing the initial mesh into the mesh. This may include, for example, reducing unnecessary and/or redundant vertices, closing holes in the mesh, and/or making a more regular mesh out of the initial mesh.

Step 303 tessellates the mesh to obtain tessellation vertices. For each face tessellation is applied to, tessellation divides the face into smaller, regular pieces. Tessellation is described in further detail in FIG. 6.

The tessellation vertices for each facet are obtained in accordance with the values of any tessellation parameters. Vertices are serialized, for example, by an embodiment described in FIG. 10.

Step 304 comprises obtaining values for each tessellation vertex. For each facet subject to tessellation, a set of tessellation vertices is generated. For each of these, a value may be assigned. A value can be determined several ways; it may be, for example, determined by a nearest neighbor algorithm as described below, either by a number of nearest neighbors, or nearest neighbors within a certain distance. Examples of methods of obtaining values are detailed in FIG. 9. The values may be derived from the subscans used to generate the initial model. The values may be serialized, that is, ordered, the same order as the tessellation vertices.

Step 305 stores the serialized values of the tessellation vertices. The serialized values may be stored, for example, in computer memory or computer storage. Note that the order of the serialized values, when combined with tessellation, may be used to ascertain the location of each value. Steps 303-305 are discussed in further detail in FIG. 7.

The serialized values may be rendered immediately after per Step 310, or they may be further processed through steps 306 to 309

Step 306 comprises saving the serialized values in storage. Storage may be, for example, a hard drive, a solid state drive, and/or cloud storage. Computer storage allows for long term storage, as well as further compression of file size, for example, as in Step 307 and/or 308. Steps 307 and 308 may be included as part of step 306. Step 306 is described in further detail in FIG. 11, steps 1100.

Step 307 further comprises reducing the file size of the mesh with the serialized values by storing values are stored as residuals, i.e. differences rather than absolute values. Embodiments are discussed in FIG. 13 and FIG. 14.

Step 308 further comprises discarding duplicate values, for example, on the edge between two faces where the vertices have the same colors. An embodiment is discussed in FIG. 15.

Step 309 comprises loading the serialized values from storage back into memory. It may be regarded as a reversal of step 306. By loading the serialized values back in to memory, Step 309 prepares the mesh model to be rendered with color. Step 309 is described in further detail in FIG. 11, Steps 1110.

Step 310 renders the mesh into a 2D image through a rendering pipeline, for example, OpenGL, DirectX, and/or Direct3D. Rendering pipelines are discussed in further detail in FIG. 5. Step 310 further comprises Step 311, tessellating the mesh model with a shader and Step 312 reading the serialized values to the tessellation vertices. Steps 311 and 312 are discussed in further detail in FIG. 8.

Step 313 displays the 2D image tessellated with serialized values, after rendering. This may be done, for example, on an screen and/or monitor. This is discussed in further detail in FIG. 8.

FIG. 4 shows examples of mesh models.

FIG. 4A is a mesh model of a molar. It is a regular, triangular mesh.

FIG. 4B is a mesh model of the lower jaw of an oral situation. It is a triangular mesh.

FIG. 5 shows two embodiments of rendering pipelines, OpenGL and Microsoft Direct3D. Rendering pipelines take mesh models and render them suitable for display on a 2D screen. Although there are differences between the two pipelines, they are similar enough that one overview can explain major steps of both of them. For further details, see OpenGL's "Rendering Pipeline Overview" and Microsoft's "Graphics Pipeline". In this disclosure, terms from Direct3D may be used, but may be interchangeable with their counterparts from OpenGL.

FIG. 5A shows an embodiment of the OpenGL rendering pipeline.

FIG. 5B shows an embodiment of the Direct3D rendering pipeline.

Vertex Specification 501a/Input-Assembler 501b is where the initial inputs into the pipeline are defined such that the rest of the rendering pipeline can be applied. Typically, the vertices of a mesh are read into primitives, i.e. the basic object upon which the shaders of the pipeline do their work. Primitives may be, for example, triangles, quadrilaterals, points, and/or lines. In an embodiment, triangles are used.

Vertex Shader 502a/Vertex Shader 502b performs operations on vertices, for example, transformations, lighting, etc, Tessellation 503a/503b may be an optional step, where a primitive is tessellated into smaller pieces such that more definition can be added. This may be, for example, geometric definition, e.g. changing a single flat facet into a number of smaller facets at different angles to better simulate a curved surface.

Figure 6:
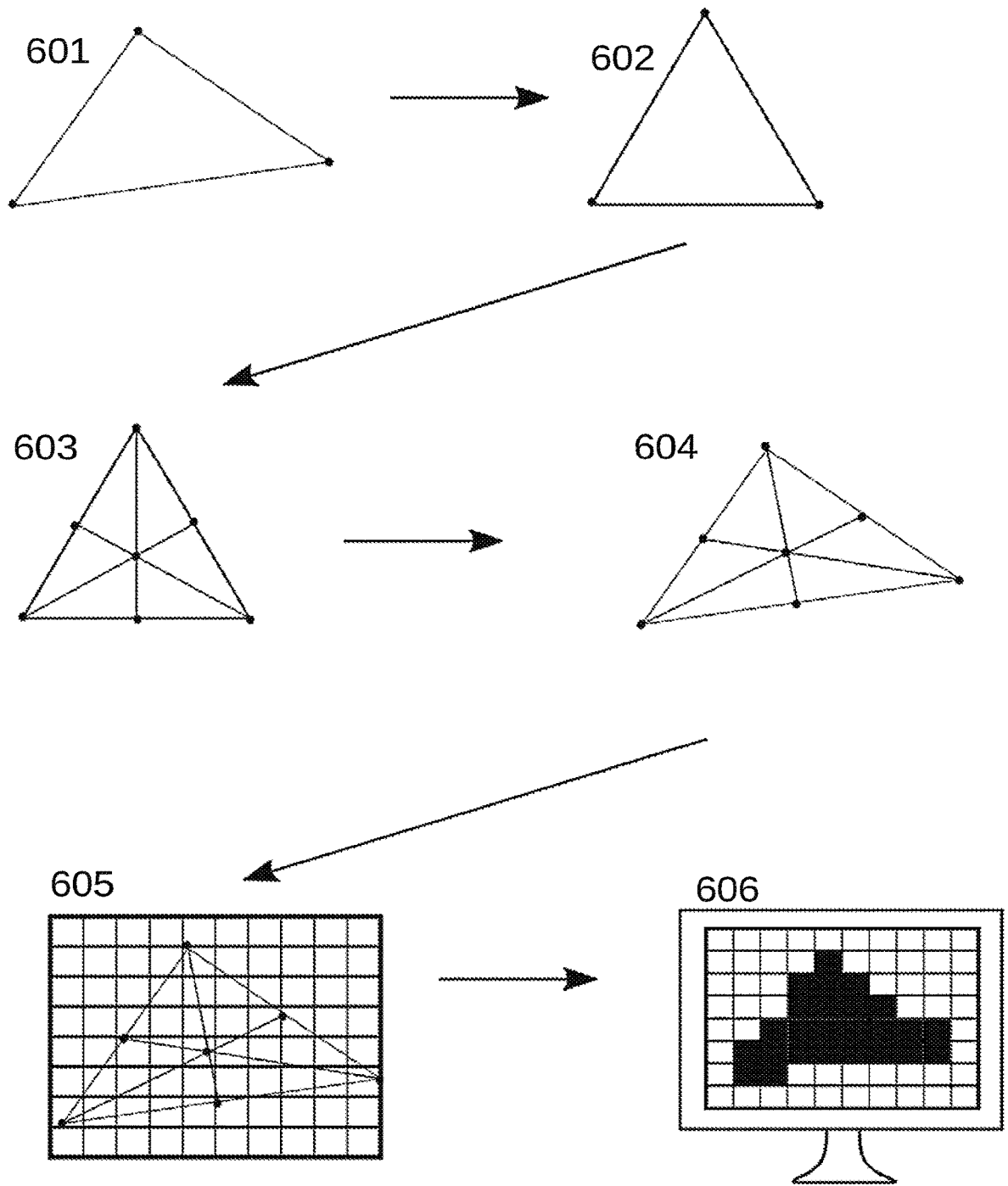
FIG. 6 shows an embodiment of tessellation of a triangular primitive.

Tessellation at this stage may comprise three shaders, Tessellation control shader 504a/Hull Shader 504b, Tessellation Primitive Generator 505a/Tessellator 505b, and Tessellation Evaluation Shader 506a.Domain Shader 506b. A more detailed example of tessellation on an individual facet is shown in FIG. 6.

Tessellation may also be done by geometry shader 507a/507b. Although tessellation is shown here as part of a rendering pipeline; it need not be. Tessellation can be performed by either hardware or software; tessellation processes are often embedded into hardware because they allow for mass parallelization.

Tessellation control shader 504a/Hull Shader 504b changes an input patch into a tessellation primitive. Input patches may be any patch defined on the mesh, and may be, for example, a facet of the mesh, or an area independent of the facets. Primitives may be, for example, triangles, quadrilaterals, points, and/or lines. In an embodiment, the input patch may be a facet of a triangular mesh and the primitive may be an equilateral triangle. In another embodiment, the input patch may be a quadrilateral, and the primitive may be a square. Tessellation control shader 504a/Hull Shader 504b also pass on parameters concerning the tessellation, for example, inner tessellation factors, outer tessellation factors, and/or tessellation vertices spacing. Examples of parameters for a triangular primitive are shown in FIG. 10.

Tessellation primitive generator 505a/Tessellator 505b defines tessellation vertices and tessellation edges on the tesselation primitive, based on the parameters from Tessellation control shader 504a/Hull Shader 504b. Tessellation vertices are points that may be generated on the primitive based on tessellation parameters, for example, by calculating barycentric coordinates, and/or coordinates on a unit square. Tessellation edges may be generated by connecting tessellation vertices and/or mesh vertices. Embodiments are discussed in FIG. 6 and FIG. 9.

Because the tessellation primitives are uniform, operations on them can easily be parallelized, i.e. run at the same time. This allows for far more efficient processing, and is a reason why tessellation is embedded into hardware.

Tessellation evaluation shader 506a/Domain Shader 506b projects tessellation vertices and tessellation edges back to the input patch. An embodiment is shown in FIG. 6.

Geometry Shader 507a/507b performs further operations on primitives. Geometry shader 507a/507 may work on individual primitives rather than input patches. Tessellation of primitives may be done here, as well.

OpenGL, as depicted in FIG. 5A, lists a few additional steps in its pipeline overview. Vertex Post-processing 508a performs additional operations on the vertices, which may, for example, prepare the vertices for primitive assembly 509a and rasterizaton 510a. Primitive Assembly 509a comprises dividing primitives into a sequence of individual base primitives and some further processing.

Rasterization 510a/Rasterizer 510b converts the mesh model from shapes and/or primitives into a raster image, e.g. pixels. A toy example may be seen in FIG. 6.

Fragment Shader 511a/Pixel Shader 511b performs operations on individual fragments and/or pixels generated by the rasterization process. Examples of operations comprise: per-pixel lighting, post-processing.

Per Sample Operations 512a/Output Merger 512b determine the final pixel output.

FIG. 6 shows an embodiment of tessellation of a triangular primitive.

Step 601 shows an example of an input patch, here, a triangular facet of a mesh.

Step 602 processes the input patch into a primitive. Here, the primitive may be an equilateral triangle.

Step 603 generates tessellation vertices and tessellation edges based on tessellation parameters. Tessellation parameters comprise, for example: inner tessellation factors, outer tessellation factors, vertex spacing, and/or resolution. Parameters are discussed in further detail in FIG. 10. The primitive now has: mesh vertices from the original mesh and tessellation vertices generated by the tessellation; tessellation edges connecting the tessellation vertices and/or mesh vertices; tessellation facets defined by the tessellation vertices and/or mesh vertices. Tessellation edges may overlap edges from the mesh.

To calculate where the tessellation vertices are, the tessellator may use, for example, barycentric coordinates to tessellate a plurality of facets. These calculations may be parallelized for faster processing. Details such as curvature or translations may also be added at this step.

Step 604 projects tessellation vertices back on to the input patch, creating the tessellated patch. This may be done by converting the barycentric coordinates to locations on the facets of the original mesh. This may be done to multiple facets on the mesh, rendering the mesh in higher resolution than is stored by the mesh vertices alone. This can be done relatively quickly using built-in tessellation hardware, making the rendering process faster than for a mesh of the same underlying object with more vertices.

Step 605 rasterizes the tessellated patch into a 2D image, as well as otherwise postprocessing the image. In this context, rasterization is the process of rendering a three-dimensional mesh model into a two-dimensional image, for example, for display on a pixelated screen. This example is a toy example to illustrate the process.

Rasterization may determine what is displayed in an individual pixel. Here, each pixel is smaller than the tessellated patch, and so must show a portion of the tessellated patch. Other postprocessing may take into account the location of the area of the tessellated patch shown. For example, given that the tessellated patch exists as a plane in 3D space, and assuming a light source from above, one edge of the facet may be darker than the other. In another embodiment, however, the image may be "zoomed out", and multiple tessellated patches may be contained in a single pixel. These are rasterized and postprocessed accordingly.

Rasterization and postprocessing allow an image to be displayed, based on the mesh.

Step 606 displays the rasterized and postprocessed image of the mesh model on a screen. This is a toy example rendered in black and white for illustration, but on a standard screen, for example, of 1366×768 pixels, this allows underlying objects to be rendered with visual details showing the shape and dimensionality of the underlying object.

Figure 7:
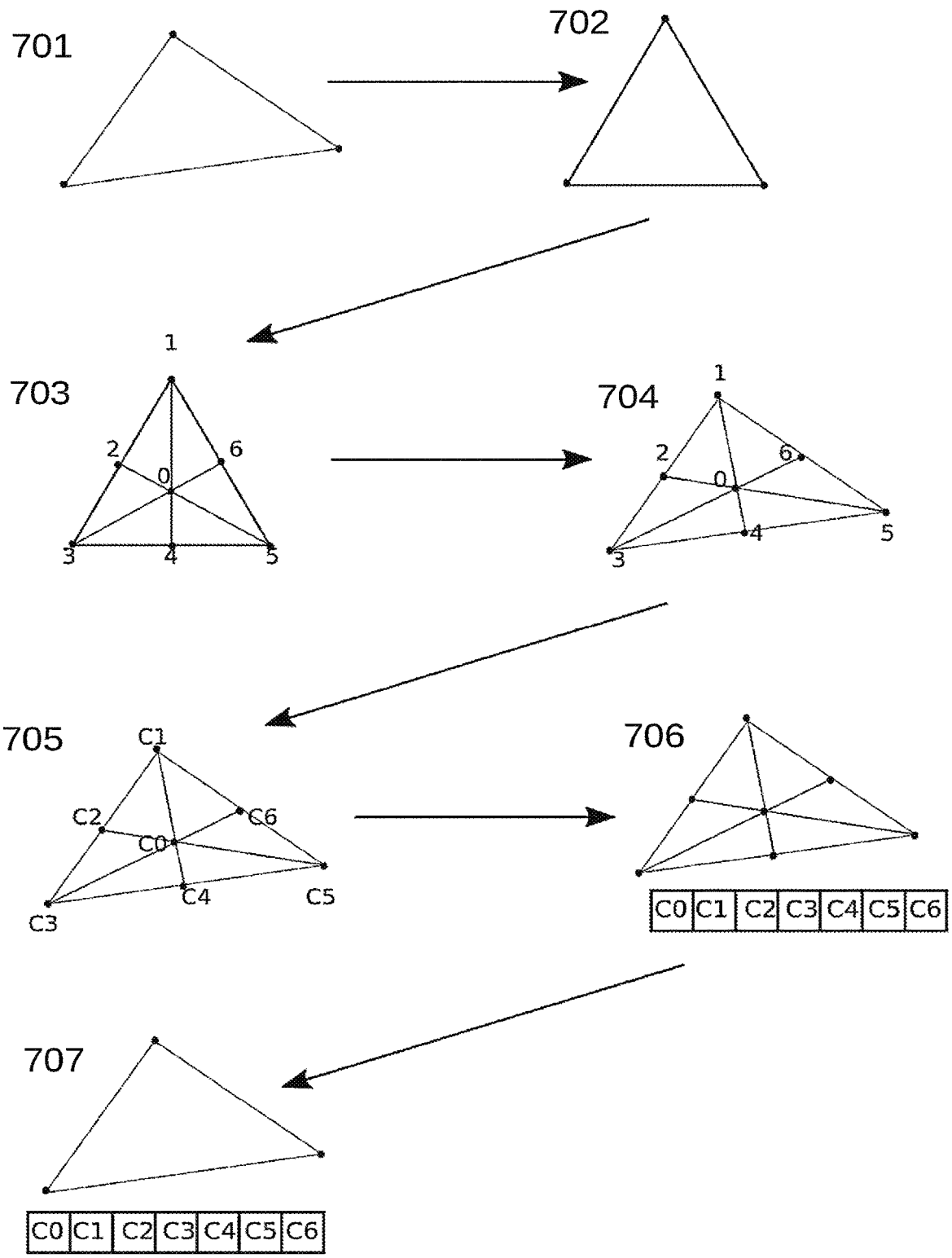
FIG. 7 shows an embodiment where serialized color values are obtained for a triangular primitive.

FIG. 7 shows an embodiment where serialized color values are obtained for a triangular primitive.

Step 701 shows an embodiment of an input patch, which may be a triangular face of a mesh model. The face has three vertices from the mesh, known as mesh vertices.

Step 702, processes the triangular face into an equilateral triangle.

Step 703 generates tessellation vertices and tessellation edges based on the tessellation parameters, here, an inner tessellation factor of 2 outer tessellation factors of (2, 2, 2), and evenly-spaced vertices. Step 703 also serializes the vertices, assigning a number to each vertex on the tessellated vertex. This may be done, for example, according to the embodiment in FIG. 10A-E.

The primitive now has: mesh vertices 1, 3, and 5; tessellation vertices 0, 2, 4, and 6; tessellation edges connecting the tessellation vertices and/or mesh vertices; tessellation facets defined by the tessellation vertices and/or mesh vertices.

Step 704 projects tessellation vertices back on to the face. This is done by converting the barycentric coordinates to locations on the triangular face. The vertex numbering from step 703 is maintained.

Step 705 obtains color values for each tessellation vertex, resulting in color values C0-C6, corresponding to the color values for vertices 0-6. The color values may be one of the formats discussed above. Methods for obtaining colors values are discussed below, in FIG. 9.

Step 706 serializes the color values C0-C6, according to the serialization order of the vertices. The serialized color values may be stored, for example, as a list, an array, and/or other data structures where the order of the color values can be ascertained.

Step 707 discards the other tessellation information, leaving only the original facet and the serialized color values C0-C6.

Figure 8:
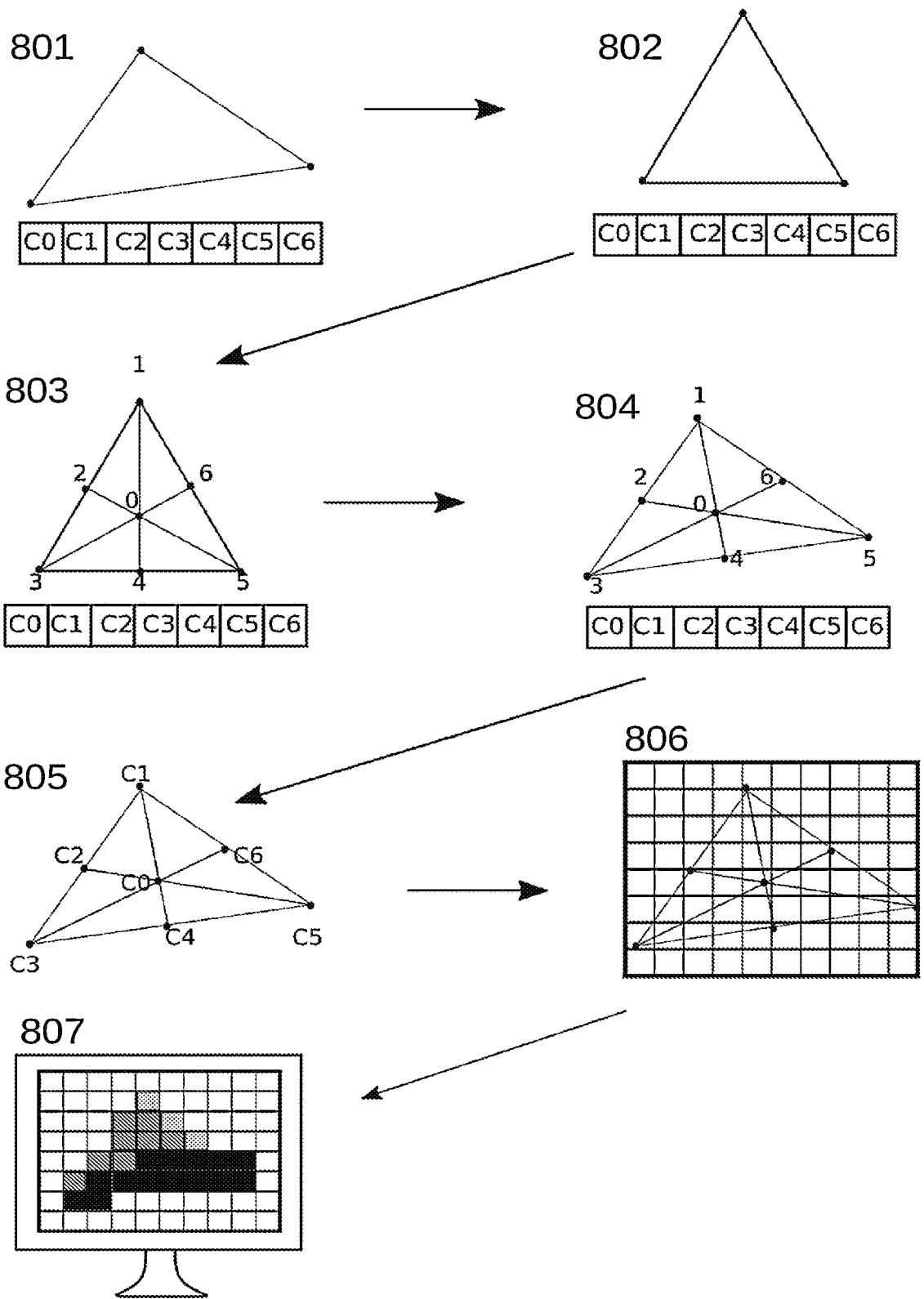
FIG. 8 shows an embodiment where serialized color values are rendered and displayed for a triangular primitive.

FIG. 8 shows an embodiment where serialized color values are rendered and displayed for a triangular primitive.

Step 801 shows an example of a face of a mesh with serialized color values C0-C6. The face may be used as an input patch. The serialized color values may have been obtained through the embodiments detailed in FIG. 7 and FIG. 9.

Step 802 processes the face into a primitive. Here, the primitive is an equilateral triangle. The hull shader also contains tessellation parameters, which, in this embodiment are: inner tessellation factor=2, outer tessellation factors=(2, 2, 2), vertex spacing=even.

Step 803 generates tessellation vertices and tessellation edges, and serializes vertices on the tessellated face. The primitive now has: mesh vertices 1, 3, and 5; tessellation vertices 0, 2, 4, and 6; tessellation edges connecting the tessellation vertices and/or mesh vertices; tessellation facets defined by the tessellation vertices and/or mesh vertices. Although the mesh vertices existed on the input patch/primitive, tessellation assigns each mesh vertex a number.

Step 804 projects tessellation vertices 0-6 back on to the original facet, possibly by using barycentric coordinates.

Step 805 assigns each of the serialized color values C0-C6 to the appropriate tessellation vertex, resulting in a face with more details in color than the original primitive in Step 801.

Step 806 rasterizes and otherwise postprocesses the face into a 2D image. The color information on the face is also rasterized and postprocessed.

Step 807 displays the rasterized and postprocessed image on a screen, with color information from the serialized color values.

FIG. 9 shows embodiments for methods of obtaining values from subcomponents.

FIG. 9A shows aligned subcomponents 901a, 902a, and 903a and mesh 904a. The meshes 901-904a may be, for example, 3D triangular meshes. Here, meshes are shown in profile, for ease of illustration. Subcomponents 901a-903a may be, for example, meshes from a subscans generated by scanning with a 3D scanner; each has vertices with information comprising: color values, location values. Mesh 904a may be a mesh generated from a combination of subcomponents 901a-903a. Vertex 905a is a vertex on mesh 904a.

FIG. 9B shows an embodiment obtaining values from subcomponents using nearest neighbors within a particular distance. As in FIG. 9A, Subcomponents 901b-903b may be meshes from a subscans generated by scanning with a 3D scanner, mesh 904b may be a mesh generated from a combination of subcomponents 901b-903b, and Vertex 905b is a vertex on mesh 904b.

To obtain a value for vertex 905b on the geometry mesh, an area 906b is defined. Area 906b may be, for example, a sphere or circle of a particular radius, e.g. 10 nm, 300 nm, etc. The value of vertex 905b may be, for example, an average or a weighted average of the values of the vertices from subcomponents 901b-903b contained in Area 906b.

FIG. 9C shows an embodiment obtaining values from subcomponents using a particular number of nearest neighbors. As in FIG. 9A, Subcomponents 901c-903c may be meshes from a subscans generated by scanning with a 3D scanner, mesh 904c may be a mesh generated from a combination of subcomponents 901c-903c, and Vertex 905c is a vertex on mesh 904c.

To obtain a value for vertex 905c on the geometry mesh, a certain number of nearest neighboring vertices from the subcomponents 901c-903c are found; here, the nearest three are chosen, as determined by Euclidean distance. The value of vertex 905c may be an average or a weighted average of the values of the subcomponent vertices.

FIG. 10 shows examples of triangular primitives tessellated with different tessellation parameters, including the order of vertices on a tessellated primitive.

FIG. 10 shows examples of primitives tessellated with different tessellation parameters, and their respective serialization orders.

FIG. 10A-F show triangular primitives.

FIG. 10A shows an triangular primitive, with mesh vertices v0, v1, and v2. This may be, for example, the output of the hull shader after all primitives have been regularized. The hull shader may include tessellation parameters to define how the tessellation is performed. The tessellation factors for a triangular primitive may include, for example: inner tessellation factor, outer tessellation factor, vertex spacing.

The inner tessellation factor for a triangle may be defined as follows: "Triangle tessellation is defined based on generating concentric triangles within the outer triangle. But the number of concentric triangles generated is half of the inner tessellation level, rounded down." An odd number for an inner tessellation factor means there is no central vertex; an even number means there is a central vertex.

The outer tessellation factor for a triangle is simply how many vertices are on the edge, including an original mesh vertex. It may be expressed as a positive integer, usually as a list of three, i.e. one for each edge. They may or may not be the same for each edge.

Vertex spacing determines how the vertices are spaced relative to one another. Here, they may be evenly spaced.

Similar tessellation parameters may be used for quadrilaterals.

For the triangular primitive of FIG. 10A, a tessellation that would not change the primitive would have an inner tessellation factor of 1 and outer tessellation factors of (1, 1, 1).

For the tessellated primitives in FIG. 10A-E, the serialization order of the vertices may be based on: barycentric coordinates, tessellation factors.

An embodiment of finding the an index number for the vertices may be as follows:

```
// Finds the index of a point on a triangular ring (provided that the ring has
// the same tesselation factor on each edge). Also assumes that the tessela-
tion
factor is an even number.
int calculateRingIndex(float3 uvw, int ringNumber, int halfTessFactor,
float3 otf)
{
  if (ringNumber < halfTessFactor)
  {
    int numSubd = 2 * ringNumber;
    // Scale the barycentric coordinates so they're all integers.
    float3 scaledUVW = numSubd * uvw;
    int3 iUVW = (int3) round(scaledUVW);
    // Identify the edge we're on and return an index around the ring
accordingly.
      if (iUVW.z == 0 && iUVW.x != 0)
      {
        return iUVW.y;
      }
      if (iUVW.x == 0 && iUVW.y != 0)
      {
        return numSubd + iUVW.z;
      }
      return 2 * numSubd + iUVW.x;
  }
  else
  {
    if (uvw.z == 0 && uvw.x != 0)
    {
      return round(otf.z * uvw.y);
    }
    if (uvw.x == 0 && uvw.y != 0)
    {
      return otf.z + round(otf.x * uvw.z);
    }
    return otf.z + otf.x + round(otf.y * uvw.x);
  }
}
// Converts the barycentric coordinates to an index for mesh color look-up
int uvwToIndex(float3 uvw, int halfTessFactor, float3 outerTessFactors)
{
  // Find the smallest barycentric coordinate to identify which ring we're
on.
    float minUVW = min(uvw.x, min(uvw.y, uvw.z));
    int ringNumber = halfTessFactor - (int) round((minUVW * 3.0f *
halfTessFactor));
    if (ringNumber == 0)
      return 0;
    int ringStartIdx = 1 + 3 * (ringNumber - 1) * ringNumber;
    // Shift and re-scale the barycentric coordinates, so they describe point
position
    // within a given ring correctly.
    float3 newUVW = (uvw - minUVW) / (1.0f - 3.0f * minUVW);
    return ringStartIdx + calculateRingIndex(newUVW, ringNumber,
halfTessFactor, outerTessFactors);
}
```

FIG. 10B shows a tessellated triangular primitive with an inner tessellation factor of 2, outer tessellation factors of (2, 1, 1), and evenly spaced vertices. As demonstrated here, outer tessellation factors need not be the same. This level of detail may be appropriate for certain functions. The serialization of the vertices may be according to the code above. Note that the numbering of the vertices may be consistent, i.e. the same with each tessellation given the same tessellation parameters.

FIG. 10C shows a tessellated triangular primitive with an inner tessellation factor of 2, outer tessellation factors of (2, 2, 2), and evenly spaced vertices. The serialization of the vertices may be according to the code above.

FIG. 10D shows a tessellated triangular primitive with an inner tessellation factor of 4, outer tessellation factors of (4, 4, 4), and evenly spaced vertices. The serialization of the vertices may be according to the code above. By selecting higher values of tessellation factors, more detail can be rendered, since there are more tessellation vertices.

FIG. 10E shows a tessellated triangular primitive with inner tessellation factor of 6 and outer tessellation factors of (6, 6, 6), and evenly spaced vertices. The serialization of the vertices may be according to the code above.

FIGS. 10F and 10G show quadrilateral primitives. For an explanation of their tessellation parameters, see, e.g. OpenGL's "Tessellation" article, in the references.

For the serialization order of a tessellated quadrilateral, an embodiment to serialize the vertices may be Convert location to Euclidean coordinates
Sort by X Value
Where X value equal:
    Sort by Y value This embodiment is applied to the numbering in 10F and 10G.

FIG. 10F shows a tessellated quadrilateral primitive with inner tessellation factors (4, 4). The serialization of vertices may be according to the pseudocode above.

FIG. 10G shows a tessellated quadrilateral primitive with inner tessellation factors (6, 7) and outer tessellation factors (4, 2, 9, 3). The serialization of vertices may be according to the pseudocode above.

FIG. 11 shows embodiments of saving and loading workflows for a mesh with serialized color values.

Flowchart 1100 shows an embodiment saving a mesh.

Step 1101 serializes the vertices and facets, storing each vertex and associated facets in a particular order.

Step 1102 stores mesh connectivity, storing how the vertices are connected to each other.

Step 1103 converts vertex colors to residuals, e.g. as described in detail in FIG. 13. This reduces the amount of space required to store the file.

Step 1104 converts the serialized color values to residuals, e.g. as described in detail in FIG. 13 and/or FIG. 14. This reduces the amount of space required to store the file.

Step 1105 compresses the vertex colors and inner colors into an even smaller file size with arithmetic coding, for example, entropy coding. Entropy coding is a general lossless data compression method that encodes symbols by using an amount of bits inversely proportional to the probability of the symbols, and is further described in Wiegand & Schwatrz.

Step 1106 serialized the vertex and inner colors to be reconstructed later, e.g. as partially described in FIG. 10.

Flowchart 1110 shows an embodiment loading a mesh.

Step 1111 reverses step 1101 by taking the serialized vertices and facets and deserializing them back into a 3D mesh space.

Step 1112 reverses step 1105 by decompressing the vertex colors and inner colors, through arithmetic coding.

Step 1113 uses the information stored from Step 1102 to generate the mesh connectivity.

Step 1114 converts the residual vertex colors back to their absolute color values, reversing step 1103. See, e.g. FIG. 13, FIG. 14.

Step 1115 converts the residuals of the serialized color values back to their absolute color values, reversing step 1104. See, e.g. FIG. 13, FIG. 14.

Step 1116 assigns the facet data, i.e. assigns the decompressed color values to their correct locations the reconstructed mesh.

FIG. 12 is a simplified example of a comparison between the storage required by a mesh with mesh vertex colors and a mesh with serialized color values at the same color resolution.

Mesh 1200 is a mesh with mesh vertex colors. It has 7 vertices, 12 edges, and 6 facets. It may be stored, for example, as data structure 1201, where each vertex is given a position value and a color value. i.e. a list with 7 items of two values each.

Mesh 1210 is a mesh with serialized color values. It has 3 vertices, 3 edges, and one facet. Further details will be rendered in once it is tessellated, including the colors. It may be stored, for example, as data structure 1211, which is a list of 3 items, where the first item has a location value and 7 color values, and the other two items each store a location. Tessellation can generate the location information of the other vertices, and add in the correct color values.

As displayed, mesh 1200 and mesh 1210 may have identical color values at the same locations. Data structure 1211, however, may use less storage than data structure 1201.

FIG. 13 is an example of using residuals of interpolated colors. Here, RGB values are used, though similar measures may be taken for other values, such as hexcodes or CMYK values.

Frequently, color information does not exist in a vacuum. Nearby points are likely to have similar colors. Hence, the color of a given point can be interpolated based on its nearest neighbors.

This prediction may be used to reduce the storage space required by original colors, where original colors may be the colors measured or calculated based on known measurements. Larger numbers take more space to store. An RGB value, for example, is a set of three values of up to three digits each. By storing the difference between the known color and the interpolated color, the storage space is reduced.

1300 shows an example of original color values for a tessellated primitive 1301, with color values stored in data structure 1302. Mesh vertices 1, 3, and 5 from primitive 1301 belong to the original mesh; Tessellation vertices 0, 2, 4, and 6 are vertices generated by the process of tessellation. The term inner colors may be used for color values associated with tessellation vertices, as they are "inside" the original facet.

Corresponding data structure 1302 may list the original color values of vertices 0-6 as RGB values. The original color values may be measured or calculated from measurements, for example, by the methods described in FIG. 9. These color values display as shades of off-white that may, for example, be the color of a tooth facet.

1310 shows an example of a method of interpolating colors with barycentric coordinates.

Primitive 1311, with corresponding data structure 1312, may have three mesh vertices with color values of [246, 237,237], [255, 249, 243], and [254, 253, 241]. Primitive 1311 may be tessellated into Primitive 1313; the tessellated vertices may have barycentric coordinates 1314 based on the original three vertices. Barycentric coordinates are coordinates for triangles that allow any point on the triangle to be mapped out based on the point's distance from the vertices of the triangles. Here, they are given a value based on [distance from vertex 1, distance from vertex 3, distance from vertex 5]

The barycentric coordinates may be used to interpolate color values for the tessellated vertices. For example, tessellated vertex 2 is halfway between mesh vertices 1 and 3, with barycentric coordinates of [%, %, 0]. So, its color values are taken from vertices 1 and 3, weighted at 50% each. The same is done for the other tessellated vertices, resulting in primitive 1315 with interpolated colors per data structure 1316.

1320 shows how the residuals based on the interpolated colors may be stored. Data structure 1322 contains the original color values, data structure 1326 contains the interpolated color values, and data stricture 1327 contains the residual colors, i.e. the difference between 1322 and 1326. As can be seen from this toy example, data structure 1327 has a much lower character count that 1322.

FIG. 14 shows histograms of color values clustered around an average.

FIG. 14A shows a histogram of the vertex color values found in a typical dental scan.

FIG. 14B shows a histogram of the inner color values found in a typical dental scan.

Another embodiment where the storage for color values is reduced include storing the residual between the original color and the average color. This may be used alternatively or in conjunction with the residual storage on interpolated colors in FIG. 13. For example, the vertex colors may be stored as residuals from an average, and inner colors may be stored based on residuals from an interpolation.

RGB values are one way to store colors. Here, those RGB values are converted to decimal values for easier comparisons. As can be seen from the histograms 14A and 14B, some colors appear much more frequently than others; selecting the most frequent color as a baseline for residuals allows the storage of the color values in the mesh with less space.

FIG. 15 shows an embodiment for storing duplicate values more efficiently.

When serialized values are saved in storage, they can be stored more efficiently, since they don't need to be immediately accessed. One way to do this is through a data structure that allows the same value to be read more than once.

FIG. 15A shows an embodiment where serialized values are saved as one long list. This is what happens if you were to store the colors directly as they are read for tessellation. Mesh 1501a comprises four facets and 19 vertices. Data structure 1502a shows per-facet storage for values, where each facet is named for its central vertex (A, H, O, V) and each value is assigned a lower case letter. As you can see, each facet has seven values stored, which means that the list is 28 items long. However, values for vertices shared between facets are recorded twice.

FIG. 15B shows an embodiment where values are saved such that a shared vertex may be accessed again rather than listed again. Six facets may be stored with 27 values. Compare this to only four facets for 28 values in FIG. 15A.

Mesh 1501b comprises six facets and 27 vertices. Data structure 1502b shows the values stored for the vertices. Each facet is named after its central vertex in Mesh 1501b, resulting in facets A, H, L, P, T, X. Tessellating assigns the values to the correct vertex by reading data structure 1502b in the right order. For example, for facet L, the serialized values would be l, d, m, n, o, j, i.

To read these from the list of colors in data structure 1502b, for the nth facet on the list, where n>1, color 0 is found at 4n+4.

For n>2: colors to be serialized start at position 4n−6; for even values of n, the tessellation order is [1, null, null, null, 3, 2, 0, 4, 5, 6] and for odd values of n, the tessellation order is [1, null, null, null, null, 6, 5, null, 0, 2, 3, 4]. As can be seen from the table, facet A (n=1) and facet H (n=2) are special cases.

Since tessellation assigns values, the values can be stored much more efficiently. Further, where meshes share more vertices, fewer colors need to be listed.

Figure 16:
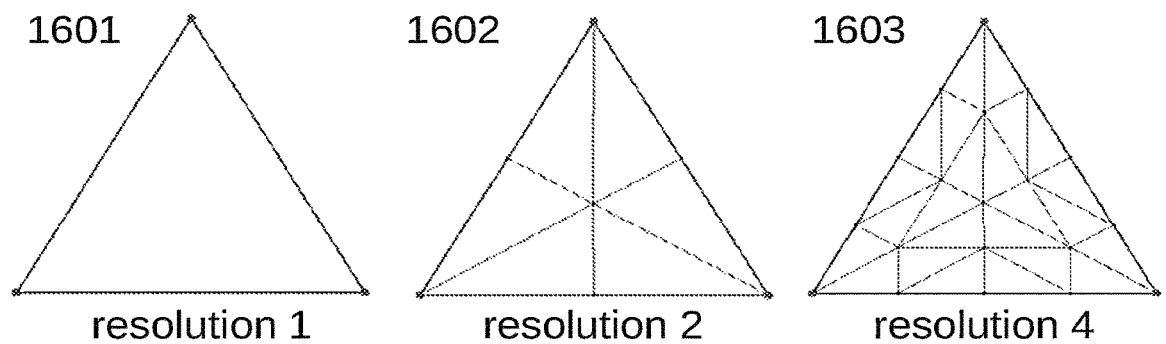
FIG. 16 shows comparisons of file size for a mesh without color, the same mesh with a texture map, and the same mesh with serialized color values at different resolutions.

FIG. 16 shows comparisons of file size for a mesh without color, the same mesh with a texture wrap, and the same mesh with serialized color values at different resolutions.

Facet 1601 is an triangular primitive of resolution 1, i.e. where the inner tessellation factor=1 and the outer tessellation factor=(1, 1, 1). Facet 1602 is a tessellated primitive of resolution 2, i.e. where the inner tessellation factor=2 and outer tessellation factor=(2, 2, 2). Facet 1603 is a tessellated primitive of resolution 4, i.e. where the inner tessellation factor=4 and the outer tessellation factor=(4, 4, 4).

Table 1604 shows an embodiment comparing file sizes for storage at different resolutions and methods for a particular mesh. The amount of kB used by the color is determined in comparison to a mesh with no colors, at 2286 kB.

At resolution 1, a mesh with texture wrap takes 3314 kb, of which 1028 kB is color data. In comparison, tessellating with serialized color values at resolution 1 results in a file size of 2518 kB, where 232 kB of that file is used by color data.

At resolution 2, tessellating with serialized color values results in a file size of 3241 kB. Note that this is still smaller than texture mapping at resolution 1, and has twice the color detail. At resolution 4, tessellating with serialized color values results in a file of 5668 kB.

Although some embodiments have been described and shown in detail, the invention is not restricted to them, but may also be embodied in other ways within the scope of the subject matter defined in the following claims. In particular, it is to be understood that other embodiments may be utilized and structural and functional modifications may be made without departing from the scope of the present invention.

In device claims enumerating several means, several of these means can be embodied by one and the same item of hardware. The mere fact that certain measures are recited in mutually different dependent claims or described in different embodiments does not indicate that a combination of these measures cannot be used to advantage.

A claim may refer to any of the preceding claims, and "any" is understood to mean "any one or more" of the preceding claims.

The term "obtaining" as used in this specification may refer to physically acquiring for example medical images using a medical imaging device, but it may also refer for example to loading into a computer an image or a digital representation previously acquired.

It should be emphasized that the term "comprises/comprising" when used in this specification is taken to specify the presence of stated features, integers, steps or components but does not preclude the presence or addition of one or more other features, integers, steps, components or groups thereof.

The features of the method described above and in the following may be implemented in software and carried out on a data processing system or other processing means caused by the execution of computer-executable instructions. The instructions may be program code means loaded in a memory, such as a RAM, from a storage medium or from another computer via a computer network. Alternatively, the described features may be implemented by hard-wired circuitry instead of software or in combination with software.

REFERENCES

"Rendering Pipeline Overview", OpenGL, https://www.khronos.org/opengl/wiki/Rendering_Pipeline_Overview, 8 Apr. 2019.
"Tessellation", OpenGL, https://www.khronos.org/opengl/wiki/Tessellation, 31 Dec. 2019.
"Graphics Pipeline", Microsoft, https://docs.microsoft.com/en-us/windows/win32/direct3d11/overviews-direct3d-11-graphics-pipeline, 31 May 2018.
"How triangle patch tessellation is done using edge and inner tessellation factors?" https://stackoverflow.com/questions/37647181/how-triangle-patch-tessellation-is-done-using-edge-and-inner-tessellation-factor, 5 Jun. 2016.
Wiegand, Thomas and Schwarz, Heiko; "Chapter 3.5 Probability Interval Partitioning Entropy Coding" from "Source Coding: Part I of Fundamentals of Source and Video Coding", available at http://iphome.hhi.de/wiegand/assets/pdfs/VBpart1.pdf, 2011.

The invention claimed is:

1. A method of storing information in a mesh, comprising:
tessellating a plurality of input patches of the mesh, wherein tessellating produces at least one tessellation vertex for each of the plurality of input patches;
serializing vertices of the tessellated input patches;
calculating a value for each vertex;
serializing the values according to the serialization of the vertices; and
storing the serialized values as residuals.

2. A method according to claim 1, where serializing comprises generating a serialization order based on coordinates.

3. A method according to claim 1, where the value is a color value.

4. A method according to claim 1, where the mesh is based on a three-dimensional object.

5. A method according to claim 1, further comprising rendering the mesh using the serialized values.

6. A method according to claim 1, further comprising generating the mesh based on a plurality of subcomponents.

7. A method according to claim 1, further comprising deriving at least one value for a point on the mesh.

8. A method according to claim 1, further comprising saving the serialized values to computer storage.

9. A method according to claim 1, further comprising storing the serialized values in a data structure that removes duplicate values of vertices shared between at least two faces.

10. A computer program product in a non-transitory medium configured, when run, to execute the method of claim 1.

* * * * *